(12) United States Patent
Kenny et al.

(10) Patent No.: US 6,988,534 B2
(45) Date of Patent: Jan. 24, 2006

(54) METHOD AND APPARATUS FOR FLEXIBLE FLUID DELIVERY FOR COOLING DESIRED HOT SPOTS IN A HEAT PRODUCING DEVICE

(75) Inventors: Thomas W. Kenny, San Carlos, CA (US); Mark Munch, Los Altos, CA (US); Peng Zhou, Albany, CA (US); James Gill Shook, Santa Cruz, CA (US); Girish Upadhya, San Jose, CA (US); Kenneth Goodson, Belmont, CA (US); David Corbin, Los Altos, CA (US)

(73) Assignee: Cooligy, Inc., Mountain View, CA (US)

( * ) Notice: Subject to any disclaimer, the term of this patent is extended or adjusted under 35 U.S.C. 154(b) by 13 days.

(21) Appl. No.: 10/439,635

(22) Filed: May 16, 2003

(65) Prior Publication Data

US 2004/0104022 A1 Jun. 3, 2004

Related U.S. Application Data

(60) Provisional application No. 60/455,729, filed on Mar. 17, 2003, provisional application No. 60/442,382, filed on Jan. 23, 2003, and provisional application No. 60/423,009, filed on Nov. 1, 2002.

(51) Int. Cl.
   *F28F 7/00* (2006.01)

(52) U.S. Cl. ............................... 165/80.4; 165/104.21; 165/104.33; 361/700; 174/15.1; 257/715

(58) Field of Classification Search ............... 165/80.4, 165/185, 104.21, 104.33; 361/699, 700; 257/714–716; 174/15.1
See application file for complete search history.

(56) References Cited

U.S. PATENT DOCUMENTS

| 596,062 | A | 12/1897 | Firey |
| 2,039,593 | A | 5/1936 | Hubbuch et al. |

(Continued)

FOREIGN PATENT DOCUMENTS

| CN | 97212126.9 | 3/1997 |
| JP | 1-256775 | 10/1989 |

(Continued)

OTHER PUBLICATIONS

Stephen C. Jacobson et al., "Fused Quartz Substrates for Microchip Electrophoresis", Analytical Chemistry, vol. 67, No. 13, Jul. 1, 1995, pp. 2059–2063.

(Continued)

*Primary Examiner*—Terrell McKinnon
(74) *Attorney, Agent, or Firm*—Haverstock & Owens LLP

(57) ABSTRACT

A heat exchanger apparatus and method of manufacturing comprising: an interface layer for cooling a heat source and configured to pass fluid therethrough, the interface layer having an appropriate thermal conductivity and a manifold layer for providing fluid to the interface layer, wherein the manifold layer is configured to achieve temperature uniformity in the heat source preferably by cooling interface hot spot regions. A plurality of fluid ports are configured to the heat exchanger such as an inlet port and outlet port, whereby the fluid ports are configured vertically and horizontally. The manifold layer circulates fluid to a predetermined interface hot spot region in the interface layer, wherein the interface hot spot region is associated with the hot spot. The heat exchanger preferably includes an intermediate layer positioned between the interface and manifold layers and optimally channels fluid to the interface hot spot region.

127 Claims, 14 Drawing Sheets

U.S. PATENT DOCUMENTS

| | | |
|---|---|---|
| 2,273,505 A | 2/1942 | Florian |
| 3,361,195 A | 1/1968 | Meyerhoff et al. |
| 3,654,988 A | 4/1972 | Clayton, III |
| 3,771,219 A | 11/1973 | Tuzi et al. |
| 3,817,321 A | 6/1974 | von Cube et al. |
| 3,823,572 A | 7/1974 | Cochran, Jr. |
| 3,923,426 A | 12/1975 | Theeuwes |
| 3,929,154 A | 12/1975 | Goodwin |
| 3,948,316 A | 4/1976 | Souriau |
| 4,109,707 A | 8/1978 | Wilson et al. |
| 4,194,559 A | 3/1980 | Eastman |
| 4,211,208 A | 7/1980 | Lindner |
| 4,248,295 A | 2/1981 | Ernst et al. |
| 4,312,012 A | 1/1982 | Frieser et al. .................. 357/82 |
| 4,450,472 A | 5/1984 | Tuckerman et al. ........... 357/82 |
| 4,467,861 A | 8/1984 | Kiseev et al. |
| 4,485,429 A | 11/1984 | Mittal |
| 4,516,632 A | 5/1985 | Swift et al. ................... 165/167 |
| 4,540,115 A | 9/1985 | Hawrylo |
| 4,561,040 A | 12/1985 | Eastman et al. ............. 361/385 |
| 4,567,505 A | 1/1986 | Pease et al. .................... 357/81 |
| 4,573,067 A | 2/1986 | Tuckerman et al. ........... 357/82 |
| 4,574,876 A | 3/1986 | Aid |
| 4,644,385 A | 2/1987 | Nakanishi et al. |
| 4,664,181 A | 5/1987 | Sumberg |
| 4,758,926 A | 7/1988 | Herrell et al. ............... 361/385 |
| 4,866,570 A | 9/1989 | Porter |
| 4,868,712 A | 9/1989 | Woodman .................... 361/388 |
| 4,893,174 A | 1/1990 | Yamada et al. |
| 4,894,709 A | 1/1990 | Phillips et al. ................. 357/82 |
| 4,896,719 A | 1/1990 | O'Neill et al. ............... 165/170 |
| 4,903,761 A | 2/1990 | Cima |
| 4,908,112 A | 3/1990 | Pace ....................... 204/299 R |
| 4,938,280 A | 7/1990 | Clark .......................... 165/80.4 |
| 5,009,760 A | 4/1991 | Zare et al. |
| 5,016,090 A | 5/1991 | Galyon et al. |
| 5,016,138 A | 5/1991 | Woodman .................... 361/381 |
| 5,043,797 A | 8/1991 | Lopes |
| 5,057,908 A | 10/1991 | Weber ........................... 357/81 |
| 5,058,627 A | 10/1991 | Brannen |
| 5,070,040 A | 12/1991 | Pankove ....................... 437/209 |
| 5,083,194 A | 1/1992 | Bartilson ....................... 357/81 |
| 5,088,005 A | 2/1992 | Ciaccio |
| 5,096,388 A | 3/1992 | Weinberg |
| 5,099,311 A | 3/1992 | Bonde et al. .................. 357/82 |
| 5,099,910 A | 3/1992 | Walpole et al. ............. 165/80.4 |
| 5,125,451 A | 6/1992 | Matthews .................... 165/80.4 |
| 5,131,233 A | 7/1992 | Cray et al. ....................... 62/64 |
| 5,161,089 A * | 11/1992 | Chu et al. .................... 361/703 |
| 5,179,500 A | 1/1993 | Koubek et al. ............. 361/385 |
| 5,203,401 A | 4/1993 | Hamburgen et al. ....... 165/80.4 |
| 5,218,515 A | 6/1993 | Bernhardt .................... 361/385 |
| 5,219,278 A | 6/1993 | Van Lintel |
| 5,228,502 A | 7/1993 | Chu et al. |
| 5,230,564 A | 7/1993 | Bartilson et al. ........... 374/178 |
| 5,232,047 A | 8/1993 | Matthews .................... 165/168 |
| 5,239,200 A | 8/1993 | Messina et al. ............. 257/714 |
| 5,239,443 A * | 8/1993 | Fahey et al. ................. 361/689 |
| 5,263,251 A | 11/1993 | Matthews .............. 29/840.036 |
| 5,265,670 A | 11/1993 | Zingher |
| 5,269,372 A | 12/1993 | Chu et al. |
| 5,274,920 A | 1/1994 | Matthews .............. 29/890.039 |
| 5,275,237 A | 1/1994 | Rolfson et al. |
| 5,281,026 A | 1/1994 | Bartilson et al. ........... 374/143 |
| 5,308,429 A | 5/1994 | Bradley |
| 5,309,319 A * | 5/1994 | Messina ....................... 361/699 |
| 5,310,440 A * | 5/1994 | Zingher ................ 156/345.11 |
| 5,317,805 A | 6/1994 | Hoopman et al. ....... 29/890.03 |
| 5,325,265 A | 6/1994 | Turlik et al. ................ 361/702 |
| 5,336,062 A | 8/1994 | Richter |
| 5,346,000 A | 9/1994 | Schlitt |
| 5,368,143 A | 11/1994 | Pond et al. |
| 5,380,956 A | 1/1995 | Loo et al. |
| 5,383,340 A | 1/1995 | Larson et al. ............... 62/259.2 |
| 5,388,635 A * | 2/1995 | Gruber et al. ............. 165/80.4 |
| 5,421,943 A | 6/1995 | Tam et al. |
| 5,427,174 A | 6/1995 | Lomolino, Sr. et al. ........ 165/1 |
| 5,436,793 A | 7/1995 | Sanwo et al. ............... 361/689 |
| 5,459,099 A | 10/1995 | Hsu .......................... 437/180 |
| 5,490,117 A | 2/1996 | Oda et al. |
| 5,508,234 A | 4/1996 | Dusablon, Sr. et al. ..... 437/228 |
| 5,514,832 A | 5/1996 | Dusablon, Sr. et al. .... 174/15.1 |
| 5,514,906 A | 5/1996 | Love et al. .................. 257/712 |
| 5,575,929 A | 11/1996 | Yu et al. ....................... 216/10 |
| 5,641,400 A | 6/1997 | Kaltenbach et al. ..... 210/198.2 |
| 5,658,831 A | 8/1997 | Layton et al. |
| 5,675,473 A | 10/1997 | McDunn et al. |
| 5,692,558 A | 12/1997 | Hamilton et al. .......... 165/80.4 |
| 5,696,405 A | 12/1997 | Weld .......................... 257/714 |
| 5,703,536 A | 12/1997 | Davis et al. ................. 330/289 |
| 5,704,416 A | 1/1998 | Larson et al. ........... 165/104.33 |
| 5,727,618 A | 3/1998 | Mundinger et al. ........ 165/80.4 |
| 5,740,013 A | 4/1998 | Roesner et al. |
| 5,768,104 A | 6/1998 | Salmonson et al. |
| 5,774,779 A | 6/1998 | Tuchinskiy .................... 419/2 |
| 5,801,442 A | 9/1998 | Hamilton et al. ........... 257/714 |
| 5,835,345 A * | 11/1998 | Staskus et al. .............. 361/699 |
| 5,921,087 A | 7/1999 | Bhatia et al. |
| 5,945,217 A | 8/1999 | Hanrahan |
| 5,978,220 A | 11/1999 | Frey et al. |
| 5,993,750 A * | 11/1999 | Ghosh et al. ............... 422/191 |
| 6,019,165 A * | 2/2000 | Batchelder ................. 165/80.3 |
| 6,034,872 A | 3/2000 | Chrysler et al. |
| 6,039,114 A | 3/2000 | Becker et al. |
| 6,054,034 A | 4/2000 | Soane et al. ................. 204/601 |
| 6,129,260 A | 10/2000 | Andrus et al. |
| 6,131,650 A | 10/2000 | North et al. ................. 165/170 |
| 6,140,860 A | 10/2000 | Sandhu et al. |
| 6,206,022 B1 | 3/2001 | Tsai et al. |
| 6,234,240 B1 | 5/2001 | Cheon ....................... 165/80.3 |
| 6,238,538 B1 | 5/2001 | Parce et al. ................. 204/600 |
| 6,253,832 B1 | 7/2001 | Hallefalt |
| 6,253,835 B1 | 7/2001 | Chu et al. |
| 6,257,320 B1 | 7/2001 | Wargo |
| 6,277,257 B1 | 8/2001 | Paul et al. ................... 204/450 |
| 6,330,907 B1 | 12/2001 | Ogushi et al. |
| 6,336,497 B1 | 1/2002 | Lin |
| 6,366,462 B1 | 4/2002 | Chu et al. |
| 6,366,467 B1 | 4/2002 | Patel et al. |
| 6,367,544 B1 | 4/2002 | Calaman |
| 6,388,317 B1 | 5/2002 | Reese ......................... 257/713 |
| 6,396,706 B1 | 5/2002 | Wohlfarth |
| 6,397,932 B1 | 6/2002 | Calaman et al. |
| 6,415,860 B1 | 7/2002 | Kelly et al. ................. 165/748 |
| 6,431,260 B1 * | 8/2002 | Agonafer et al. .......... 165/80.4 |
| 6,437,981 B1 | 8/2002 | Newton et al. |
| 6,438,984 B1 | 8/2002 | Novotny et al. |
| 6,459,581 B1 | 10/2002 | Newton et al. |
| 6,466,442 B2 | 10/2002 | Lin |
| 6,477,045 B1 | 11/2002 | Wang |
| 6,492,200 B1 | 12/2002 | Park et al. |
| 6,519,151 B2 * | 2/2003 | Chu et al. .................... 361/699 |
| 6,533,029 B1 | 3/2003 | Phillips |
| 6,536,516 B2 | 3/2003 | Davies et al. |
| 6,578,626 B1 | 6/2003 | Calaman et al. |
| 6,581,388 B2 | 6/2003 | Novotny et al. |
| 6,587,343 B2 | 7/2003 | Novotny et al. |
| 6,600,220 B2 | 7/2003 | Barber et al. |
| 6,601,643 B2 | 8/2003 | Cho et al. |
| 6,609,560 B2 | 8/2003 | Cho et al. |
| 6,632,719 B1 | 10/2003 | DeBoer et al. ............. 438/381 |

| | | | |
|---|---|---|---|
| 6,651,735 | B2 | 11/2003 | Cho et al. |
| 6,729,383 | B1 * | 5/2004 | Cannell et al. ............ 165/80.3 |
| 6,743,664 | B2 | 6/2004 | Liang et al. |
| 2002/0121105 | A1 | 9/2002 | McCarthy, Jr. et al. |
| 2002/0134543 | A1 | 9/2002 | Estes et al. |
| 2003/0121274 | A1 | 7/2003 | Wightman |
| 2003/0213580 | A1 | 11/2003 | Philpott et al. |
| 2004/0040695 | A1 | 3/2004 | Chesser et al. |
| 2004/0052049 | A1 | 3/2004 | Wu et al. |
| 2004/0089008 | A1 | 5/2004 | Tilton et al. |
| 2004/0125561 | A1 | 7/2004 | Gwin et al. |
| 2004/0160741 | A1 | 8/2004 | Moss et al. |
| 2004/0188069 | A1 | 9/2004 | Tomioka et al. |

FOREIGN PATENT DOCUMENTS

| | | |
|---|---|---|
| JP | 10-99592 | 4/1998 |
| JP | 2000-277540 | 10/2000 |
| JP | 2001-326311 | 11/2001 |

OTHER PUBLICATIONS

Kendra V. Sharp et al., "Liquid Flows in Microchannels", The MEMS Handbook, vol. 6, 2002, pp. 6–1 to 6–38.

Shuchi Shoji et al., "Microflow devices and systems", J. Micromech. Microeng. 4 (1994), pp. 157–171, printed in the U.K.

Angela Rasmussen et al., "Fabrication Techniques to Realize CMOS–Compatible Microfluidic Microchannels", Journal of Microelectromechanical, vol. 10, No. 2, Jun. 2001, pp. 286–297.

J. H. Wang et al., "Thermal–Hydraulic Characteristic of Micro Heat Exchangers", DSC–vol. 32, ASME Micromechanical Sensors, Actuators, and Systems, 1991, pp. 331–339.

Gad Hetsroni et al., "Nonuniform Temperature Distribution in Electronic Devices Cooled by Flow in Parallel Microchannels", IEEE Transactions on Components and Packaging Technologies, vol. 24, No. 1, Mar. 2001, pp. 16–23.

X. F. Peng et al., "Heat Transfer Characteristics of Water Flowing Through Microchannels", Experimental Heat Transfer, vol. 7, No. 4, Oct.–Dec. 1994, pp. 265–283.

Linan Jiang et al., "Forced Convection Boiling in a Microchannel Heat Sink", Journal of Microelectromechanical Systems, vol. 10, No. 1, Mar. 2001, pp. 80–87.

Muhammad M. Rahman et al., "Experimental Measurements of Fluid Flow and Heat Transfer in Microchannel Cooling Passages in a Chip Substrate", EEP–vol. 4–2, ASME Advances in Electronic Packages, 1993, pp. 685–692.

X. F. Peng et al., "Forced Convection and Flow Boiling Heat Transfer for Liquid Flowing Through Microchannels", vol. 36, No. 14, 1993, Int. J. Heat Mass Transfer, pp. 3421–3427.

Lung–Jieh Yang et al., "A Micro Fluidic System of Micro Channels with On–Site Sensors by Silicon Bulk Micromaching", vol. 3877, Sep. 1999, Microfluidic Devices and Systems II, pp. 267–272.

G. Mohiuddin Mala et al., "Heat Transfer and Fluid Flow in Microchannels", vol. 40, No. 13, 1997, Int. J. Heat Mass transfer, pp. 3079–3088, printed in Great Britain.

J. M. Cuta et al., "Fabrication and Testing of Micro–Channel Heat Exchangers", SPIE Microlithography and Metrology in Micromaching, vol. 2640, 1995, pp. 152–164.

Linan Jiang et al., "A Micro–Channel Heat Sink with Integrated Temperature Sensors for Phase Transition Study", 1999, 12$^{th}$ IEEE International Conference on Micro ElectroMechanical Systems, pp. 159–164.

Linan Jiang et al., "Fabrication and Characterization of a Microsystem for a Micro–Scale Heat Transfer Study", J. Micromech. Microeng. 9 (1999) pp. 422–428, printed in the U.K.

M. B. Bowers et al., "High Flux Boiling in Low Flow Rate, Low Pressure Drop Mini–Channel and Micro–Channel Heat Sinks", vol. 37, No. 2, 1994, Int. J. Heat Mass Transfer, pp. 321–332.

Yongendra Joshi, "Heat Out of Small Packages", Dec. 2001, Mechanical Engineering, pp. 56–58.

A. Rostami et al., "Liquid Flow and Heat Transfer in Microchannels: a Review", vol. 18, No. 2, 2000, Heat and Technology, pp. 59–68.

Lian Zhang et al., "Measurements and Modeling of Two–Phase Flow in Microchannels with Nearly Constant Heat Flux Boundary Conditions", Journal of Microelectromechanical Systems, vol. 11, No. 1, Feb. 2002, pp. 12–19.

Muhammad Mustafizur Rahman, "Measurements of Heat Transfer in Microchannel Heat Sinks", Int. Comm. Heat Mass Transfer, vol. 27, No. 4, May 2000, pp. 495–506.

Issam Mudawar et al., "Enhancement of Critical Heat Flux from High Power Microelectronic Heat Sources in a Flow Channel", Journal of Electronic Packaging, vol. 112, Sep. 1990, pp. 241–248.

Nelson Kuan, "Experimental Evaluation of Micro Heat Exchangers Fabricated in Silicon", HTD–vol. 331, vol. 9, 1996, National Heat Transfer Conference, pp. 131–136.

E. W. Kreutz et al., "Simulation of Micro–Channel Heat Sinks for Optoelectronic Microsystems", Microelectronics Journal, vol. 31, 2000, pp. 787–790.

J. C. Y. Koh et al., "Heat Transfer of Microstructure for Integrated Circuits", vol. 13, 1986, Int. Comm. Heat Mass Transfer, pp. 89–98.

Snezana Konecni et al., "Convection Cooling of Microelectronic Chips", 1992, InterSociety Conference on Thermal Phenomena, pp. 138–144.

Michael B. Kleiner et al., "High Performance Forced Air Cooling Scheme Employing Microchannel Heat Exchangers", vol. 18, No. 4, 1995, IEEE Transactions on Components, Packaging, and Manufacturing Technology–Part A, pp. 795–804.

Jerry K. Keska Ph. D. et al., "An Experimental Study on an Enhanced Microchannel Heat Sink for Microelectronics Applications", EEP–vol. 26–2, vol. 2, Advances in Electronic Packaging, 1999, pp. 1235–1259.

Shung–Wen Kang et al., "The Performance Test and Analysis of Silicon–Based Microchannel Heat Sink", vol. 3795, Jul. 1999, Terahertz and Gigahertz Photonics, pp. 259–270.

Joseph C. Tramontana, "Semiconductor Laser Body Heat Sink", Xerox Disclosure Journal, vol. 10, No. 6, Nov./Dec. 1985, pp. 379–381.

Sarah Arulanandam et al., "Liquid Transport in Rectangular Microchannels by Electroosmotic Pumping", Colloids and Surfaces A: Physicochemical and Engineering Aspects 161 (2000), pp. 89–102.

Jeffery D. Barner et al., "Thermal Ink Jet Print Head Carriage with Integral Liquid Cooling Capabilities", Xerox Disclosure Journal–vol. 21, No. 1, Jan./Feb. 1996, pp. 33–34.

"Autonomous displacement of a solution in a microchannel by another solution", Research Disclosure, Jun. 2001, pp. 1046–1047.

John M. Waldvogel, "Aluminum Silicon Carbide Phase Change Heat Spreader", Motorola, Jun. 1999, Technical Developments, pp. 226–230.

James P. Slupe et al., "An Idea for Maintaining a Stable Thermal Environment for Electronic Devices", Research Disclosure, Aug. 2001, p. 1312.

John M. Waldvogel, "A Heat Transfer Enhancement Method for Forced Convection Bonded–Fin Heatsinks", Motorola, Dec. 1997, Technical Developments, pp. 158–159.

"Thin Heat Pipe for Cooling Components on Printed Circuit Boards", IBM Technical Disclosure Bulletin, vol. 34, No. 7B, Dec. 1991, pp. 321–322.

R. C. Chu et al., "Process for Nucleate Boiling Enhancement", IBM Technical Disclosure Bulletin, vol. 18, No. 7, Dec. 1975, p. 2227.

J. Riseman, "Structure for Cooling by Nucleate Boiling", IBM Technical Disclosure Bulletin, vol. 18, No. 11, Apr. 1976, p. 3700.

"Integrally Grooved Semiconductor Chip and Heat Sink", vol. 14, No. 5, Oct. 1971, IBM Technical Disclosure Bulletin, p. 1425.

"Enhanced Cooling of Thermal Conduction Module", IBM Technical Disclosure Bulletin, vol. 30, No. 5, Oct. 1987, p. 426.

"Heat Exchanger Modules for Data Processor with Valves Operated by Pressure from Cooling Water Pump", IBM Technical Disclosure Bulletin, vol. 30, No. 5, Oct. 1987, p. 419.

"Cold Plate for Thermal Conduction Module with Inlet for Cooling Water Near Highest Power Chips", IBM Technical Disclosure Bulletin, vol. 30, No. 5, Oct. 1987, p. 413.

"Circuit Module Cooling with Coaxial Bellows Providing Inlet, Outlet and Redundant Connections to Water–Cooled Element", IBM Technical Bulletin, vol. 30, No. 5, Oct. 1987, p. 345–347.

"Piping System with Valves Controlled by Processor for Heating Circuit Modules in a Selected Temperature Profile for Sealing Integrity Test Under Temperature Stress", IBM Technical Disclosure Bulletin, vol. 30, No. 5, Oct. 1987, p. 336.

"Cooling System for Chip Carrier on Card", IBM Technical Disclosure Bulletin, vol. 31, No. 4, Sep. 1988, pp. 39–40.

"Chip Cooling Device", IBM Technical Disclosure Bulletin, vol. 30, No. 9, Feb. 1988, pp. 435–436.

W. E. Ahearn et al., "Silicon Heat Sink Method to Control Integrated Circuit Chip Operating Temperatures", IBM Technical Disclosure Bulletin, vol. 21, No. 8, Jan. 1979, pp. 3378–3380.

N. P. Bailey et al., "Cooling Device for Controlled Rectifier", IBM Technical Disclosure Bulletin, vol. 21, No. 11, Apr. 1979, pp. 4609–4610.

W. J. Kleinfelder et al., "Liquid–Filled Bellows Heat Sink", IBM Technical Disclosure Bulletin, vol. 21, No. 10, Mar. 1979, pp. 4125–4126.

R. P. Chrisfield et al., "Distributed Power/Thermal Control", IBM Technical Disclosure Bulletin, vol. 22, No. 3, Aug. 1979, pp. 1131–1132.

A. J. Arnold et al., "Heat Sink Design for Cooling Modules in a Forced Air Environment", IBM Technical Disclosure Bulletin, vol. 22, No. 6, Nov. 1979, pp. 2297–2298.

A. J. Arnold, "Structure for the Removal of Heat from an Integrated Circuit Module", IBM Technical Disclosure Bulletin, vol. 22, No. 6, Nov. 1979, pp. 2294–2296.

U. P. Hwang et al., "Cold Plate for Thermal Conduction Module with Improved Flow Pattern and Flexible Base", IBM Technical Disclosure Bulletin, vol. 25, No. 9, Feb. 1983, p. 4517.

K. C. Gallagher et al., "Cooling System for Data Processor with Flow Restricter in Secondary Loop to Limit Bypass–Cooling Water Flow", IBM Technical Disclosure Bulletin, vol. 26, No. 5, Oct. 1983, p. 2658.

R. C. Chu et al., "Silicon Heat Sink for Semiconductor Chip", IBM Technical Disclosure Bulletin, vol. 24, No. 11A, Apr. 1982, p. 5743.

J. M. Eldridge et al., "Heat–Pipe Vapor Cooling Etched Silicon Structure", IBM Technical Disclosure Bulletin, vol. 25, No. 8, Jan. 1983, pp. 4118–4119.

J. R. Skobern, "Thermoelectrically Cooled Module", IBM Technical Disclose Bulletin, vol. 27, No. 1A, Jun. 1984, p. 30.

M. J. Brady et al., "Etched Silicon Integrated Circuit Heat Sink", IBM Technical Disclosure Bulletin, vol. 27, No. 1B, Jun. 1984, p. 627.

H. D. Edmonds et al., "Heat Exchange Element for Semiconductor Device Cooling", IBM Technical Disclosure Bulletin, vol. 23, No. 3, Aug. 1980, p. 1057.

R. W. Noth, "Heat Transfer from Silicon Chips and Wafers", IBM Technical Disclosure Bulletin, vol. 17, No. 12, May 1975, p. 3544.

"Forced Boiling Cooling System with Jet Enhancement for Crititical Heat Flux Extension", IBM Technical Disclosure Bulletin, vol. 39, No. 10, Oct. 1996, p. 143.

"Miniature Heat Exchanger for Corrosive Media", IBM Technical Disclosure Bulletin, vol. 38, No. 01, Jan. 1995, pp. 55–56.

"Self–Contained Active Heat Dissipation Device", IBM Technical Disclosure Bulletin vol. 39, No. 04, Apr. 1996, pp. 115–116.

C. J. Keller et al., "Jet Cooling Cup for Cooling Semiconductor Devices", IBM Technical Disclosure Bulletin, vol. 20, No. 9, Feb. 1978, pp. 3575–3576.

B. J. Ronkese, "Centerless Ceramic Package with Directly Connected Heat Sink", IBM Technical Disclosure Bulletin, vol. 20, No. 9, Feb. 1978, pp. 3577–3578.

K. S. Sachar, "Liquid Jet Cooling of Integrated Circuit Chips", vol. 20, No. 9, Feb. 1978, pp. 3727–3728.

A. H. Johnson, "Device Cooling", IBM Technical Disclosure Bulletin, vol. 20, No. 10, Mar. 1978, pp. 3919–3920.

A. L. Pacuzzo et al., "Integrated Circuit Module Package Cooling Structure", IBM Technical Disclosure Bulletin, vol. 20, No. 10, Mar. 1978, pp. 3898–3899.

R. D. Durand et al., "Flexible Thermal Conductor for Electronic Module", IBM Technical Disclosure Bulletin, vol. 20, No. 11A, Apr. 1978, p. 4343..

D. Balderes et al., "Liquid Cooling of a Multichip Module Package", IBM Technical Disclosure Bulletin, vol. 20, No. 11A, Apr. 1978, pp. 4336–4337.

J. A. Dorler et al., "Temperature Triggerable Fluid Coupling System for Cooling Semiconductor Dies", IBM Technical Disclosure Bulletin, vol. 20, No. 11A, Apr. 1978, pp. 4386–4388.

V. W. Antonetti et al., "Integrated Module Heat Exchanger", IBM Technical Disclosure Bulletin, vol. 20, No. 11A, Apr. 1978, p. 4498.

P. Hwang et al., "Conduction Cooling Module", IBM Technical Disclosure Bulletin, vol. 20, No. 11A, Apr. 1978, pp. 4334–4335.

A. J. Arnold, "Electronic Packaging Structure", IBM Technical Disclosure Bulletin, vol. 20, No. 11B, Apr. 1978, pp. 4820–4822.

V. Y. Doo et al., "High Performance Package for Memory", IBM Technical Disclosure Bulletin, vol. 21, No. 2, Jul. 1978, pp. 585–586.

"Multi–Chip Package with Cooling by a Spreader Plate in Contact with a Chip Having Cylindrical Holes Mating with an Inverse Frame Providing Water Flow Within its Pins", IBM Technical Disclosure Bulletin, vol. 31, No. 5, Oct. 1988, pp. 141–142.

J. Landrock et al., "Cooling System for Semiconductor Chips", IBM Technical Disclosure Bulletin, vol. 23, No. 4, Sep. 1980, p. 1483.

E. P. Damm, Jr., "Convention Cooling Apparatus", IBM Technical Disclosure Bulletin, vol. 20, No. 7, Dec. 1977, pp. 2755–2756.

"Circuit Package with Circulating Boiling Liquid and Local Heat Exchanger to Limit Vapor in Coolant Outlet", IBM Technical Disclosure Bulletin, vol. 31, No. 12 May 1989, p. 34.

"Circuit Module Cooling with Multiple Pistons Contacting a Heat Spreader/Electrical Buffer Plate in Contact with Chip", IBM Technical Disclosure Bulletin, vol. 31, No. 12, May 1989, p. 5–7.

"TCM–Like Circuit Module with Local Heat Sink Resting on Chip and Chip Separated From Coolant by Bellows with Pins and Deflector Plate Attached to Local Heat Sink and Extending Above Bellows into Region of Coolant Flow", IBM Technical Disclosure Bulletin, vol. 31, No. 11, pp. 305–306.

"Water–Cooled Circuit Module with Grooves Forming Water Passages Near Heat–Producing Devices", IBM Technical Disclosure Bulletin, vol. 31, No. 12, May 1989, pp. 49–50.

"Cold Plate for Thermal conduction Module with Only Peripheral Mounting Bolts, Large Surface Area Fin Inserts and Reduced Water Flow and Thermal Resistances", IBM Technical Disclosure Bulletin, vol. 31, No. 12, May 1989, p. 59.

"Thermal Control Hardware for Accelerated Run–In Testing of Multi–Chip Modules", IBM Technical Disclosure Bulletin, vol. 32, No. 5A, Oct. 1989, p. 129–130.

"Means of Removing More Heat From a TCM (Or Other Liquid–Cooled Logic Package) By Reducing the Coolant Temperature", IBM Technical Disclosure Bulletin, vol. 32, No. 5A, Oct. 1989, pp. 153–154.

E. G. Loeffel et al., "Liquid Cooled Module with Compliant Membrane", IBM Technical Disclosure Bulletin, vol. 20, No. 2, Jul. 1977, pp. 673–674.

V. Y. Doo et al., "Method of Effective Cooling of a High Power Silicon Chip", IBM Technical Disclosure Bulletin, vol. 20, No. 4, Sep. 1977, p. 1436–1437.

V. Y. Doo et al., Semiconductor Chip Cooling Package, IBM Technical Disclosure Bulletin, vol. 20, No. 4, Sep. 1977, pp. 1440–1441.

"Heat Sink Fabrication Method", IBM Technical Disclosure Bulletin, vol. 27, No. 10A, Mar. 1985, pp. 5656–5657.

"Thermal Conduction Module with Liquid Dielectric and Pistons with Surface Treatment for Enhanced Nucleate Boiling", IBM Technical Disclosure Bulletin, vol. 27, No. 12, May 1985, p. 6904.

"Pin Fin Array Heat Pipe Apparatus", IBM Technical Disclosure Bulletin, vol. 37, No. 09, Sep. 1994, p. 171.

H. Krumm, "Chip Cooling", IBM Technical Disclosure Bulletin, vol. 20, No. 7, Dec. 1977, p. 2728.

Youngcheol Joo et al., "Fabrication of Monolithic Microchannels for IC Chip Cooling", 1995, IEEE Micro Electro Mechanical Systems, pp. 362–367.

Jaisree Moorthy et al., *Active control of electroosmotic flow in microchannels using light,* Jan. 26, 2001, Sensors and Actuators B 75, pp. 223–229.

Andreas Manz et al., *Electroosmotic pumping and electrophoretic separations for miniaturized chemical analysis systems,* Sep. 16, 1994, J.Micromech. Microeng. 4 (1994), pp. 257–265, printed in the U.K.

E. B. Cummings et al. *Irrotationality of uniform electroosmosis,* Sep. 1999, Part of the SPIE Conference on Microfluidic Devices and Systems II, SPIE vol. 3877, pp. 180–189.

Stephen C. Jacobson et al., *Fused Quartz Substrates for Microchip Electrophoresis,* Jul. 1, 1995, Analytical Chemistry, vol. 67, No. 13, pp. 2059–2063.

Haim H. Bau, *Optimization of conduits' shape in micro heat exchangers,* Dec. 10, 1997, International Journal of Heat and Mass Transfer 41 (1998), pp. 2717–2723.

V. K. Dwivedi et al., *Fabrication of very smooth walls and bottoms of silicon microchannels for heat dissipation of semiconductor devices,* Jan. 25, 2000, Microelectronics Journal 31 (2000), pp. 405–410.

M. B. Bowers et al.,, *Two–Phase Electronic Cooling Using Mini–Channel and Micro–Channel Heat Sinks: Part 2–Flow Rate and Pressure Drop Constraints,* Dec. 1994, Journal of Electronic Packaging 116, pp. 298–305.

Meint J. de Boer et al., *Micromachining of Buried Micro Channels in Silicon,* Mar. 2000, Journal of Microelectromechanical systems, vol. 9, No. 1, pp. 94–103.

S.B. Choi et al., *Fluid Flow And Heat Transfer In Microtubes,* 1991, DSC–vol. 32, Micromechanical sensors, Actuators, and Systems, ASME 1991, pp. 123–134.

S. F. Choquette, M. Faghri et al., *Optimum Design Of Microchannel Heat Sinks,* 1996, DSC–vol. 59, Microelectromechanical Systems (MEMS), ASME 1996, pp. 115–126.

David Copeland et al., *Manifold Microchannel Heat Sinks: Theory and Experiment,* 1995, EEP–vol. 10–2, Advances in Electronic Packaging ASME 1995, pp. 829–835.

J. M. Cuta et al., *Forced Convection Heat Transfer In Parallel Channel Array Microchannel Heat Exchanger,* 1996, PID–vol. 27 HTD–vol. 338, Advances in Energy efficiency, Heat/Mass Transfer Enhancement, ASME 1996, pp. 17–23.

K. Fushinobu et al., *Heat Generation and Transport In Sub–Micron Semiconductor Devices,* 1993, HTD–vol. 253, Heat Transfer on the Microscale, ASME 1993, pp. 21–28.

Charlotte Gillot et al., *Integrated Micro Heat Sink for Power Multichip Module,* Sep. 3, 1999, IEEE Transactions on Industry Applications, vol. 36, No. 1, Jan./Feb. 2000, pp. 217–221.

John Gooding, *Microchannel heat exchangers—a review,* SPIE vol. 1997 High Heat Flux Engineering II (1993), pp. 66–82.

Koichiro Kawano et al., *Micro Channel Heat Exhanger for Cooling Electrical Equipment,* HTD–vol. 361–3/PID–vol. 3, Proceeding of the ASME Heat Transfer Division—vol. 3, ASME 1998, pp. 173–188.

Chad Harris et al., *Design and Fabrication of a Cross Flow Micro Heat Exchanger,* Dec. 2000, Journal of Micromechanical Systems, vol. 9, No. 4, pp. 502–508.

George M. Harpole et al., *Micro–Channel Heat Exchanger Optimization,* 1991, Seventh IEEE Semi–Therm Symposium, pp. 59–63.

Pei–Xue Jiang et al., *Thermal–hydraulic performance of small scale micro–channel and prous–media heat–exchangers,* 2001, International Journal of Heat and Mass Transfer 44 (2001), pp. 1039–1051.

X.N. Jiang et al., *Laminar Flow Through Microchannels Used for Microscale Cooling Systems,* 1997, IEEE/CPMT Electronic Packaging Technology Conference, pp. 119–122, Singapore.

David Bazeley Tuckerman, *Heat–Transfer Microstructures for Integrated Circuits,* Feb. 1984, pp. ii–xix, pp. 1–141.

M Esashi, *Silicon micromachining for integrated microsystems,* 1996, Vacuum/vol. 47/Nos. 6–8/pp. 469–474.

T.S. Raviguruajan et al., *Effects of Heat Flux on Two–Phase Flow characteristics of Refrigerant Flows in a Micro–Channel Heat Exchanger,* HTD–vol. 329, National Heat Transfer Conference, vol. 7, ASME 1996, pp. 167–178.

T.S. Ravigruruajan et al., *Single–Phase Flow Thermal Performance Characteristics of a Parallel Micro–Channel Heat Exchanger,* 1996, HTD–vol. 329, National Heat Transfer Conference, vol. 7, ASME 1996, pp. 157–166.

T.S. Ravigururajan et al., *Liquid Flow Characteristics in a Diamond–Pattern Micro–Heat–Exchanger,* DSC–vol. 59 Microelectromechanical Systems (IMEMS), ASME 1996, pp. 159–166.

T.S. Raviguruajan *Impact of Channel Geometry on Two–Phase Flow Heat Transfer Characteristics of Refrigerants in Microchannel Heat Exchangers,* May 1998, Journal of Heat Transfer, vol. 120, pp. 485–491.

J. Pfahler et al., *Liquid Transport in Micron and Submicron Channels,* Mar. 1990, Sensors and Actuators, A21–A23 (1990), pp. 431–434.

Kenneth Pettigrew et al., *Performance of a MEMS based Micro Capillary Pumped Loop for Chip–Level Temperature Control,* 2001, The 14$^{th}$ IEEE International Conference on Micro Electro Mechanical Systems, pp. 427–430.

C. Perret et al., *Microchannel integrated heat sinks in silicon technology,* Oct. 12–15, 1998, IEEE Industry Applications Conference, pp. 1051–1055.

X.F. Peng et al., *Convective heat transfer and flow friction for water flow in microchannel structures,* 1996, Int. J. Heat Mass Transfer, vol. 39, No. 12, pp. 2599–2608, printed in Great Britain.

X.F. Peng et al., *Experimental investigation of heat transfer in flat plates with rectangular microchannels,* 1994, Int. J. Heat Mass Transfer, vol. 38, No. 1, pp. 127–137, printed in Great Britain.

X.F. Peng et al., *Cooling Characteristics with Microchanneled Structures,* 1994, Enhanced Heat Transfer, vol. 1, No. 4, pp. 315–326, printed in the United States of America.

Yoichi Murakami et al., *Parametric Optimization of Multichananneled Heat Sinks for VLSI Chip Cooling,* Mar. 2002, IEEE Transaction on Components and Packaging Technologies, vol. 24, No. 1, pp. 2–9.

D. Mundinger et al., *High average power 2–D laser diode arrays or silicon microchannel coolers,* CLEO '89/Friday Morning/404.

L.J. Missaggia et al., *Microchannel Heat Sinks for Two–Dimensional High–Power–Density Diode Laser Arrays,* 1989, IEEE Journal of Quantum Electronics, vol. 25, No. 9, Sep. 1989, pp. 1989–1992.

M.J. Marongiu et al., *Enhancement of Multichip Modules (MCMs) Cooling by Incorporating MicroHeatPipes and Other High Thermal Conductivity Materials into Microchannels Heat Sinks,* 1998, Electronic Components and Technology Conference, pp. 45–50.

C.R. Friedrich et al., *Micro heat exchangers fabricated by diamond machining,* Jan. 1994, Precision Engineering, vol. 16, No. 1, pp. 56–59.

Mali Mahalingam, *Thermal Management in Semiconductor Device Packaging,* 1985, Proceedings of the IEEE, vol. 73, No. 9, Sep. 1985, pp. 1396–1404.

T.M. Adams et al., *An experimental investigation of single–phase forced convection in microchannels,* 1997, Int. J. Heat Mass Transfer, vol. 41, Nos. 6–7, pp. 851–857, Printed in Great Britain.

T.M. Adams et al., *Applicability of traditional turbulent single–phase forced convection correlations to non–circular micrhchannels,* 1999, Int. J. Heat and Transfer 42 (1999) pp. 4411–4415.

Bassam Badran et al., *Experimental Results for Low–Temperature Silicon Micromachined Micro Heat Pipe Arrays Using Water and Methanol as Working Fluids,* May 31, 1997, Experimental Heat Transfer, 10: pp. 253–272.

D. Jed Harrison et al., *Electroosmotic Pumping Within A Chemical Sensor System Integrated on Silicon,* Session C9 Chemical Sensors and Systems for Liquids, Jun. 26, 1991, pp. 792–795.

Kurt Seller et al., *Electroosmotic Pumping and Valveless Control of Fluid Flow within a Manifold of Capillaries on a Glass Chip,* 1994, Analytical Chemistry, vol. 66, No. 20, Oct. 15, 1994, pp. 3485–3491.

Philip H. Paul et al., *Electrokinetic Generation of High Pressures Using Porous Microstructures,* 1998, Micro–Total Analysis Systems, pp. 49–52.

Gh. Mohiuddin Mala et al., *Flow characteristics of water through a microchannel between two parallel plates with electrokinetics effects,* 1997, Int. J. Heat and Fluid Flow, vol. 18, No. 5, pp. 489–496.

W.E. Morf et al., *Partial electroosmotic pumping in complex capillary systems Part 1: Principles and general theoretical approach,* Oct. 16, 2000, Sensors and Actuators B 72 (2001), pp. 266–272.

M. Esashi, *Silicon micromachining and micromachines,* Sep. 1, 1993, Wear, vol. 168, No. 1–2, (1993), pp. 181–187.

Stephanus Buttgenbach et al., *Microflow devices for miniaturized chemical analysis systems,* Nov. 4–5, 1998, SPIE–Chemical Microsensors and Applications, vol. 3539, pp. 51–61.

Sarah Arunlanandam et al., *Liquid transport in rectangular microchannels by electroosmotic pumping,* 2000, Colloids and Surfaces A: Physicochemical and Engineering Aspects vol. 161 (2000), pp. 89–102.

Linan Jiang et al., *Closed–Loop Electroosmotic Microchannel Cooling System for VLSI Circuits,* Mechanical Engineering Dept. Stanford University, pp. 1–27.

Susan L. R. Barker et al., *Fabrication, Derivatization and Applications of Plastic Microfluidic Devices,* Proceedings of SPIE, vol. 4205. Nov. 5–8, 2000, pp. 112–118.

Timothy E. McKnight et al., *Electroosmotically Induced Hydraulic Pumping with Integrated Electrodes on Microfluidic Devices,* 2001, Anal. Chem., vol. 73, pp. 4045–4049.

Chris Bourne, *Cool Chips plc Receives Nanotech Manufacturing Patent,* Jul. 31, 2002, pp. 1–2.

Frank Wagner et al., *Electroosmotic Flow Control in Micro Channels Produced by Scanning Excimer Laser Ablation,* 2000, Proceedings of SPIE vol. 4088, Jun. 14–16, 2000, pp. 337–340.

H. A. Goodman, *Data Processor Cooling With Connection To Maintain Flow Through Standby Pump,* Dec. 1983, IBM Technical Disclosure Bulletin, vol. 26, No. 7A, p. 3325.

*Electroerosion Micropump,* May 1990, IBM Technical Disclosure Bulletin, vol. 32, No. 12, pp. 342–343.

Shulin Zeng et al., *Fabrication and Characterizaton of Electrokinetic Micro Pumps,* 2000 Inter Society Conference on Thermal Phenomena, pp. 31–35.

A. Manz et al., *Integrated Electroosmotic Pumps and Flow Manifolds for Total Chemical Analysis Systems,* 1991, Inter. Conf. on Solid–State Sensors and Actuators, pp. 939–941.

O. T. Guenat et al., *Partial electroosmotic pumping in complex capillary systems Part: 2 Fabrication and application of a micro total analysis system suited for continuous volumetric nanotitrations,* Oct. 16, 2000, Sensors and Actuators B 72 (2001) pp. 273–282.

J. G. Sunderland, *Electrokinetic dewatering and thickening. I. Introduction and historical review of electrokinetic applications,* Sep. 1987, Journal of Applied Electrochemistry vol. 17, No. 5, pp. 889–898.

J. C. Rife et al., *Acousto– and electroosmotic microfluidic controllers,* 1998, Microfluidic Devices and Systems, vol. 3515, pp. 125–135.

Pumendu K Dasgupta et al., *Electroosmosis: A Reliable Fluid Propulsion System for Flow Injection Analysis,* 1994, Anal. Chem., vol. 66, No. 11, pp. 1792–1798.

Ray Beach et al., *Modular Microchannel Cooled Heatsinks for High Average Power Laser Diode Arrays,* Apr. 1992, IEEE Journal of Quantum Electronics, vol. 28, No. 4, pp. 966–976.

Roy W. Knight et al., *Optimal Thermal Design of Air cooled Forced Convection finned Heat Sinks—Experimental Verification,* Oct. 1992, IEEE Transactions on Components, Hybrids, and Manufacturing Technology, vol. 15, No. 5 pp. 754–760.

Y. Zhuang et al., *Experimental study on local heat transfer with liquid impingement flow in two–dimensional micro–channels,* 1997, Int. J. Heat Mass Transfer, vol. 40, No. 17, pp. 4055–4059.

D. Yu et al., *An Experimental and Theoretical Investigation of Fluid Flow and Heat Transfer in Microtube,* 1995, ASME/ JSME Thermal Engineering Conference, vol. 1, pp. 523–530.

Xiaoqing Yin et al., *Micro Heat Exchangers Consisting of Pin Arrays,* 1997, Journal of Electronic Packaging Mar. 1997, vol. 119, pp. 51–57.

X. Yin et al., *Uniform Channel Micro Heat Exchangers,* 1997, Journal of Electronic Packaging Jun. 1997, vol. 119, No. 2, pp. 89–94.

Chun Yang et al., *Modeling forced liquid convection in rectangular microchannels with electrokinetic effect,* 1998, International Journal of Heat and Mass Transfer 41 (1998), pp. 4229–4249.

Arel Weisberg et al., *Analysis of microchannels for integrated cooling,* 1992, Int. J. Heat Mass Transfer, vol. 35, No. 10, pp. 2465–2473.

Roger S. Stanley et al., *Two–Phase Flow in Microchannels,* 1997, DSE–vol. 62/HTD–vol. 354, MEMS, pp. 143–152.

B. X. Wang et al., *Experimental investigation on liquid forced–convection heat transfer through microchannels,* 1994, Int. J. Heat Mass Transfer, vol. 37 Suppl. 1, pp. 73–82.

Kambiz Vafai et al., *Analysis of two–layered micro–channel heat sink concept in electronic cooling,* 1999, Int. J. Heat Mass Transfer, 42 (1999), pp. 2287–2297.

Gokturk Tune et al., *Heat transfer in rectangular microchannels,* 2002, Int. J. Heat Mass Transfer, 45 (2002), pp. 765–773.

D. B. Tuckerman et al., *High–Performance Heat Sinking for VLSI,* 1981, IEEE Electron Device Letters, vol. EDL–2, No. 5, pp. 126–129.

Bengt Sunden et al., *An Overview of Fabrication Methods and Fluid Flow and Heat Transfer Characteristics of Micro Channels,* pp. 3–23.

David S. Shen et al., *Micro Heat Spreader Enhance Heat Transfer in MCMs,* 1995, IEEE Multi–Chip Module Conference, pp. 189–194.

S. Sasaki et al., *Optimal Structure for Microgrooved Cooling Fin for High–Power LSI Devices,* Electronic Letters, Dec. 4, 1986, vol. 22, No. 25.

Vijay K. Samalam, *Convective Heat Transfer in Microchannels,* Sep. 1989, Journal of Electronic Materials, vol. 18, No. 5, pp. 611–617.

Sanjay K. Roy et al., *A Very High Heat Flux Microchannel Heat Exchanger for Cooling of Semiconductor Laser Diode Arrays,* 1996, IEEE Transactions on components, packaging, and manufacturing technology–part B, vol. 19, No. 2, pp. 444–451.

Charlotte Gillot et al., *Integrated Single and Two–Phase Micro Heat Sinks Under IGBT Chips,* IEEE Transactions on Components and Packaging Technology, vol. 22, No. 3, Sep. 1999, pp. 384–389.

Jae–Mo Koo et al., "Modeling of Two–Phase Microchannel Heat Sinks for VLSI Chips", Mech. Eng. Depart. of Stanford University, pp. 422–426.

* cited by examiner

METHOD AND APPARATUS FOR FLEXIBLE FLUID DELIVERY FOR COOLING DESIRED HOT SPOTS IN A HEAT PRODUCING DEVICE

RELATED APPLICATIONS

This Patent Application claims priority under 35 U.S.C. 119 (e) of the co-pending U.S. Provisional Patent Application, Ser. No. 60/423,009, filed Nov. 1, 2002 and entitled "METHODS FOR FLEXIBLE FLUID DELIVERY AND HOTSPOT COOLING BY MICROCHANNEL HEAT SINKS" which is hereby incorporated by reference. This Patent Application also claims priority under 35 U.S.C. 119 (e) of the co-pending U.S. Provisional Patent Application, Ser. No. 60/442,383, filed Jan. 23, 2003 and entitled "OPTIMIZED PLATE FIN HEAT EXCHANGER FOR CPU COOLING" which is also hereby incorporated by reference. In addition, this Patent Application claims priority under 35 U.S.C. 119 (e) of the co-pending U.S. Provisional Patent Application, Ser. No. 60/455,729, filed Mar. 17, 2003 and entitled "MICROCHANNEL HEAT EXCHANGER APPARATUS WITH POROUS CONFIGURATION AND METHOD OF MANUFACTURING THEREOF", which is hereby incorporated by reference.

FIELD OF THE INVENTION

The invention relates to a method and apparatus for cooling a heat producing device in general, and specifically, to a method and apparatus for flexible fluid delivery for cooling desired hot spots in an electronic device with minimal pressure drop within the heat exchanger.

BACKGROUND OF THE INVENTION

Since their introduction in the early 1980s, microchannel heat sinks have shown much potential for high heat-flux cooling applications and have been used in the industry. However, existing microchannels include conventional parallel channel arrangements which are used are not well suited for cooling heat producing devices which have spatially-varying heat loads. Such heat producing devices have areas which produce more heat than others. These hotter areas are hereby designated as "hot spots" whereas the areas of the heat source which do not produce as much heat are hereby termed, "warm spots".

FIGS. 1A and 1B illustrate a side view and top view of a prior art heat exchanger 10 which is coupled to an electronic device 99, such as a microprocessor via a thermal interface material 98. As shown in FIGS. 1A and 1B, fluid generally flows from a single inlet port 12 and flows along the bottom surface 11 in between the parallel microchannels 14, as shown by the arrows, and exits through the outlet port 16. Although the heat exchanger 10 cools the electronic device 99, the fluid flows from the inlet port 12 to the outlet port 16 in a uniform manner. In other words, the fluid flows substantially uniformly along the entire bottom surface 11 of the heat exchanger 10 and does not supply more fluid to areas in the bottom surface 11 which correspond with hot spots in the device 99. In addition, the temperature of liquid flowing from the inlet generally increases as it flows along the bottom surface 11 of the heat exchanger. Therefore, regions of the heat source 99 which are downstream or near the outlet port 16 are not supplied with cool fluid, but actually warmer fluid or two-phase fluid which has already been heated upstream. In effect, the heated fluid actually propagates the heat across the entire bottom surface 11 of the heat exchanger and region of the heat source 99, whereby fluid near the outlet port 16 is so hot that it becomes ineffective in cooling the heat source 99. This increase in heat causes two-phase flow instabilities in which the boiling of fluid along the bottom surface 11 forces fluid away from the areas where the most heat is generated. In addition, the heat exchanger 10 having only one inlet 12 and one outlet 16 forces fluid to travel along the long parallel microchannels 14 in the bottom surface 11 for the entire length of the heat exchanger 10, thereby creating a large pressure drop due to the length the fluid must travel. The large pressure drop formed in the heat exchanger 10 makes pumping fluid to the heat exchanger 10 difficult.

FIG. 1C illustrates a side view diagram of a prior art multi-level heat exchanger 20. Fluid enters the multi-level heat exchanger 20 through the port 22 and travels downward through multiple jets 28 in the middle layer 26 to the bottom surface 27 and out port 24. In addition, the fluid traveling along the jets 28 does not uniformly flow down to the bottom surface 27. Nonetheless, although the fluid entering the heat exchanger 20 is spread over the length of the heat exchanger 20, the design does not provide more fluid to the hotter areas (hot spots) of the heat exchanger 20 and heat source that are in need of more fluid flow circulation. In addition, the heat exchanger in FIG. 1C exhibits the same problems discussed above with regard to the heat exchanger 10 in FIGS. 1A and 1B.

What is needed is a heat exchanger which is configured to achieve proper temperature uniformity in the heat source. What is also needed is a heat exchanger which is configured to achieve proper uniformity in light of hot spots in the heat source. What is also needed is a heat exchanger having a relatively high thermal conductivity to adequately perform thermal exchange with the heat source. What is further needed is a heat exchanger which is configured to achieve a small pressure drop between the inlet and outlet fluid ports.

SUMMARY OF THE INVENTION

In one aspect of the invention, a microchannel heat exchanger comprises an interface layer for cooling a heat source, wherein the interface layer is configured to pass fluid therethrough. The interface layer is preferably coupled to the heat source. The heat exchanger further comprises a manifold layer for providing fluid to the interface layer. The manifold layer is configured to selectively cool at least one hot spot and preferably achieving temperature uniformity in the heat source. The manifold layer preferably includes a plurality of passages which channel fluid to the hot spots. The manifold layer includes at least one inlet port and at least one outlet port. The plurality of fluid ports circulate fluid within at least one predetermined interface hot spot region in the heat exchanger, whereby the at least one predetermined interface hot spot region is associated with the hot spot in the heat source. At least one of the plurality of fluid ports are configured vertically and horizontally.

Preferably, at least one of the plurality of fluid ports is coupled to the manifold layer. Alternatively, at least one of the plurality of fluid ports is coupled to the interface layer. The heat exchanger further comprises an intermediate layer which optimally channels fluid from the plurality of fluid ports to the at least one predetermined interface hot spot regions, whereby the intermediate layer is positioned between the interface layer and the manifold layer. The intermediate layer is coupled to the interface layer and the manifold layer and alternatively integrally formed with the interface layer and the manifold layer. The interface layer includes a coating thereupon, wherein the coating preferably provides an appropriate thermal conductivity to the interface layer of at least 20 W/m-K as well as protects the interface layer. Preferably the thermal conductivity of the coating is 100 W/m-K. The heat exchanger further comprises a plurality of microchannels which are configured in a predetermined pattern along the interface layer. The plurality of microchannels are coupled to the interface layer and alternatively integrally formed with the interface layer. The plurality of microchannels alternatively include a coating thereupon, wherein the coating preferably has an appropriate thermal conductivity of at least 20 W/m-K. The heat exchanger further comprises at least one sensor for providing information that is associated with the operation of the heat source. The sensor is disposed substantially proximal to the hot spot location. The heat exchanger further comprises a control module that is coupled to the at least one sensor. The control module controls fluid flow into the heat exchanger in response to information provided from the sensor. The heat exchanger further comprises a vapor escape membrane that is positioned above the interface layer. The vapor escape membrane allows vapor to pass therethrough to the at least one outlet port, wherein the vapor escape membrane retains fluid along the interface layer. In addition, a second heat exchanger is alternatively coupled to a surface of the heat source positioned opposite of the heat exchanger.

In another aspect of the invention, a heat exchanger comprises an interface layer for cooling a heat source. The interface layer is coupled to the heat source and is configured to pass fluid therethrough. The interface layer has a thermal conductivity of at least 20 W/m-K. The heat exchanger also comprises a manifold layer for providing fluid to the interface layer, whereby the manifold layer is configured to optimize hot spot cooling of the heat source. The heat exchanger includes at least one fluid port which is configured to optimize cooling of hot spots in the heat source. The heat exchanger includes at least one inlet port and at least one outlet port. At least one of the fluid ports in the manifold layer circulates fluid to at least one predetermined interface hot spot region in the interface layer, wherein the at least one predetermined interface hot spot region is associated with the hot spot in the heat source. A portion of the at least one fluid port is configured vertically and horizontally. The heat exchanger further comprises an intermediate layer for optimally channeling fluid from the at least one fluid port to the at least one predetermined interface hot spot region. The intermediate layer is positioned between the interface layer and the manifold layer. The intermediate layer is coupled to the interface layer and the manifold layer and alternatively integrally formed with the interface layer and the manifold layer. The intermediate layer includes a coating thereupon, wherein the coating has an appropriate thermal conductivity of at least 20 W/m-K. The heat exchanger further comprises a plurality of microchannels that are configured in a predetermined pattern along the interface layer. The plurality of microchannels are coupled to the interface layer and alternatively integrally formed with the interface layer. The plurality of microchannels include a coating thereupon, wherein the coating has an appropriate thermal conductivity of at least 20 W/m-K. The plurality of microchannels further comprise a microchannel material and the interface layer further comprises a thermal interface material. The microchannel material is the same, and alternatively different, than the thermal interface material. The heat exchanger further comprises a vapor escape membrane that is positioned above the interface layer. The vapor escape membrane allows vapor to pass therethrough to the outlet port and retains fluid along the interface layer. The heat exchanger further comprises a second heat exchanger coupled to a surface of the heat source that is positioned opposite of the heat exchanger.

In yet another aspect of the invention, a method of manufacturing a heat exchanger is configured to cool a heat source. The method comprises forming an interface layer that is configurable to be coupled to the heat source. The interface layer has a thermal conductivity of at least 20 W/m-K to sufficiently transfer heat between the heat source and the interface layer. The method also comprises forming a manifold layer in conjunction with the interface layer, wherein the manifold layer is configured to provide fluid to flow along the interface layer to cool the heat source. The method further comprises determining one or more hot spot locations in the heat source. The method further comprises configuring the heat exchanger into a plurality of interface hot spot regions, wherein each interface hot spot region is associated with the one or more hot spot locations. The method further comprises coupling a plurality of fluid ports to the heat exchanger, wherein one or more of the plurality of fluid ports are configured to circulate fluid directly to one or more selected interface hot spot regions in the plurality of interface hot spot regions. A portion of the plurality of fluid inlets are configured vertically and horizontally. The method further comprises forming an intermediate layer that is in between the manifold layer and the interface layer. The intermediate layer is configured to optimally channel the fluid from the manifold layer to the one or more selected interface hot spot regions. The intermediate layer is coupled to the interface layer and the manifold layer. The intermediate layer is alternatively integrally formed with the manifold layer and the interface layer. The method further comprises applying a thermal conductive coating to the interface layer, whereby the thermal conductive coating is applied by an electroforming process. The method further comprises configuring a plurality of microchannels in a predetermined pattern along the interface layer. The method further comprises coupling the plurality of microchannels to the interface layer and alternatively integrally forming the plurality of microchannels with the interface layer. The method further comprises applying a coating upon the plurality of microchannels, wherein the coating has the appropriate thermal conductivity of at least 20 W/m-K.

The coating is preferably applied upon the plurality of microchannels by an electroforming process. The interface layer includes a interface material having a thermal expansion characteristic, whereby the thermal expansion characteristic of the interface material is substantially equivalent, or alternatively substantially different, to a corresponding thermal expansion characteristic of a heat source material. The method further comprises positioning a vapor escape membrane above the interface layer, wherein the vapor escape membrane retains fluid along the interface layer and allows vapor to pass therethrough to an outlet port. The method further comprises coupling a second heat exchanger to a surface of the heat source that is positioned opposite of the heat exchanger.

In yet another aspect of the invention, a heat exchanger comprises means for cooling a heat source. The means for cooling is coupled to the heat source and is configured to pass fluid therethrough. The heat exchanger further comprises means for providing fluid to the means for cooling. The means for providing includes a plurality of fluid inlets which are configured to optimize hot spot cooling of the heat source.

Other features and advantages of the present invention will become apparent after reviewing the detailed description of the preferred embodiments set forth below.

DETAILED DESCRIPTION OF THE PRESENT INVENTION

Generally, the heat exchanger captures thermal energy generated from a heat source by passing fluid through selective areas of the interface layer which is preferably coupled to the heat source. In particular, the fluid is directed to specific areas in the interface layer to cool the hot spots and areas around the hot spots to generally create temperature uniformity across the heat source while maintaining a small pressure drop within the heat exchanger. As discussed in the different embodiments below, the heat exchanger utilizes a plurality of apertures, channels and/or fingers in the manifold layer as well as conduits in the intermediate layer to direct and circulate fluid to and from selected hot spot areas in the interface layer. Alternatively, the heat exchanger includes several ports which are specifically disposed in predetermined locations to directly deliver fluid to and remove fluid from the hot spots to effectively cool the heat source.

It is apparent to one skilled in the art that although the microchannel heat exchanger of the present invention is described and discussed in relation to flexible fluid delivery for cooling hot spot locations in a device, the heat exchanger is alternatively used for flexible fluid delivery for heating a cold spot location in a device. It should also be noted that although the present invention is preferably described as a microchannel heat exchanger, the present invention can be used in other applications and is not limited to the discussion herein.

Figure 2A:
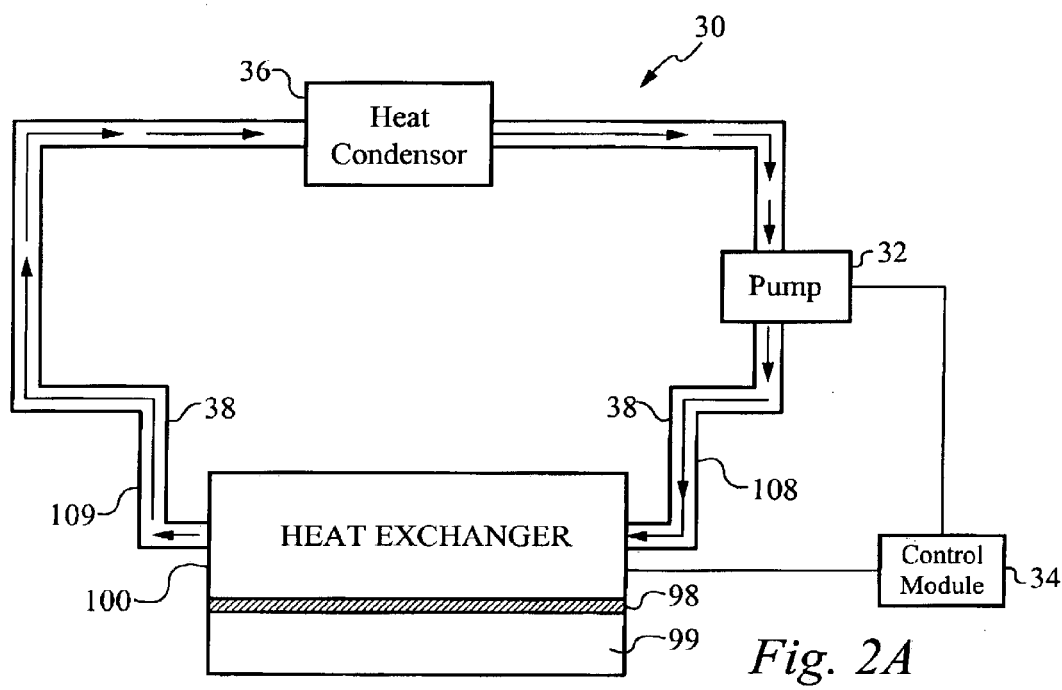
FIG. 2A illustrates a schematic diagram of a closed loop cooling system incorporating a preferred embodiment of the flexible fluid delivery microchannel heat exchanger of the present invention.
Figure 2B:
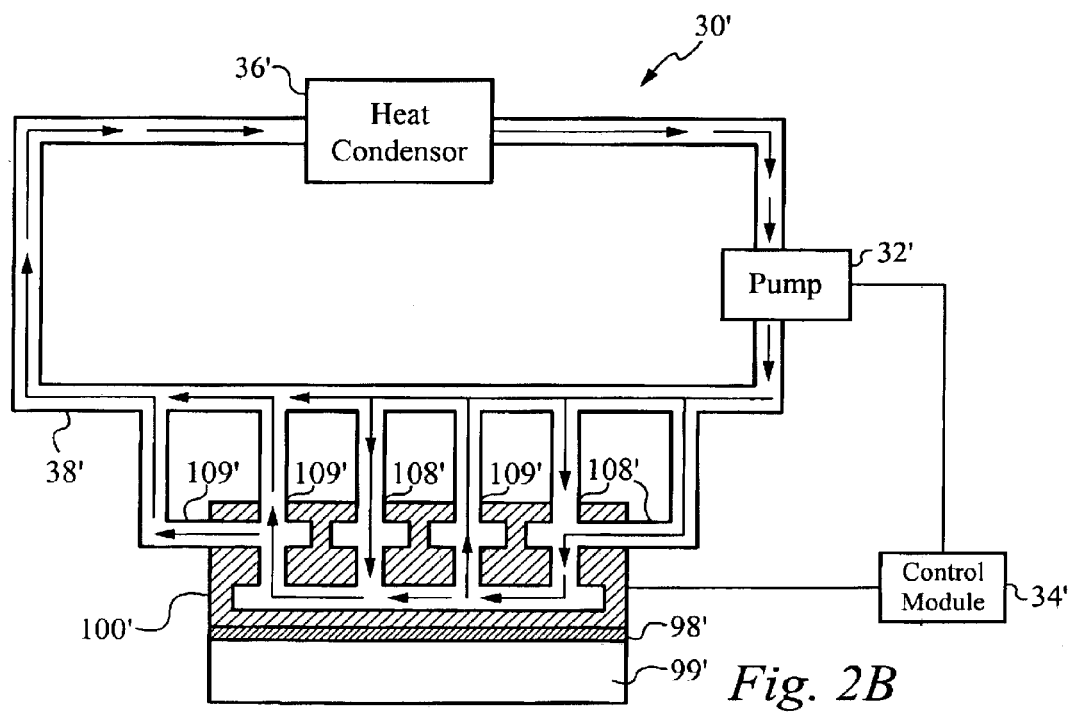
FIG. 2B illustrates a schematic diagram of a closed loop cooling system incorporating an alternative embodiment of the flexible fluid delivery microchannel heat exchanger of the present invention.

FIG. 2A illustrates a schematic diagram of a closed loop cooling system 30 which includes a preferred flexible fluid delivery microchannel heat exchanger 20 in accordance with the present invention. In addition, FIG. 2B illustrates a schematic diagram of a closed loop cooling system 30 which includes an alternative flexible fluid delivery microchannel heat exchanger 100 with multiple ports 108, 109 in accordance with the present invention.

As shown in FIG. 2A, the fluid ports 108, 109 are coupled to fluid lines 38 which are coupled to a pump 32 and heat condenser 30. The pump 32 pumps and circulates fluid within the closed loop 30. It is preferred that one fluid port 108 is used to supply fluid to the heat exchanger 100. In addition, it is preferred that one fluid port 109 is used to remove fluid from the heat exchanger 100. Preferably a uniform, constant amount of fluid flow enters and exits the heat exchanger 100 via the respective fluid ports 108, 109. Alternatively, different amounts of fluid flow enter and exit through the inlet and outlet port(s) 108, 109 at a given time. Alternatively, as shown in FIG. 2B, one pump provides fluid to several designated inlet ports 108. Alternatively, multiple pumps (not shown), provide fluid to their respective inlet and outlet ports 108, 109. In addition, the dynamic sensing and control module 34 is alternatively employed in the system to variate and dynamically control the amount and flow rate of fluid entering and exiting the preferred or alternative heat exchanger in response to varying hot spots or changes in the amount of heat in a hot spot location as well as the locations of the hot spots.

Figure 3A:
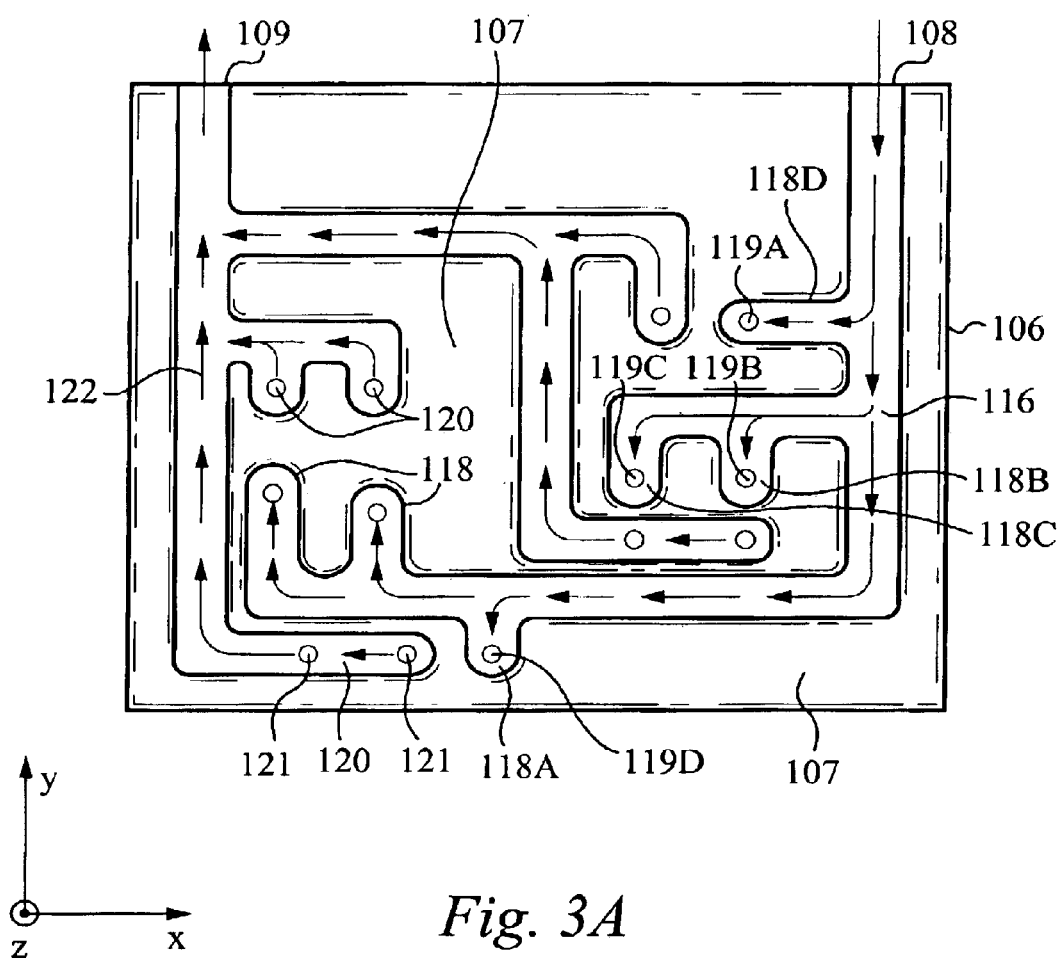
FIG. 3A illustrates a top view of the preferred manifold layer of the heat exchanger in accordance with the present invention.
Figure 3B:
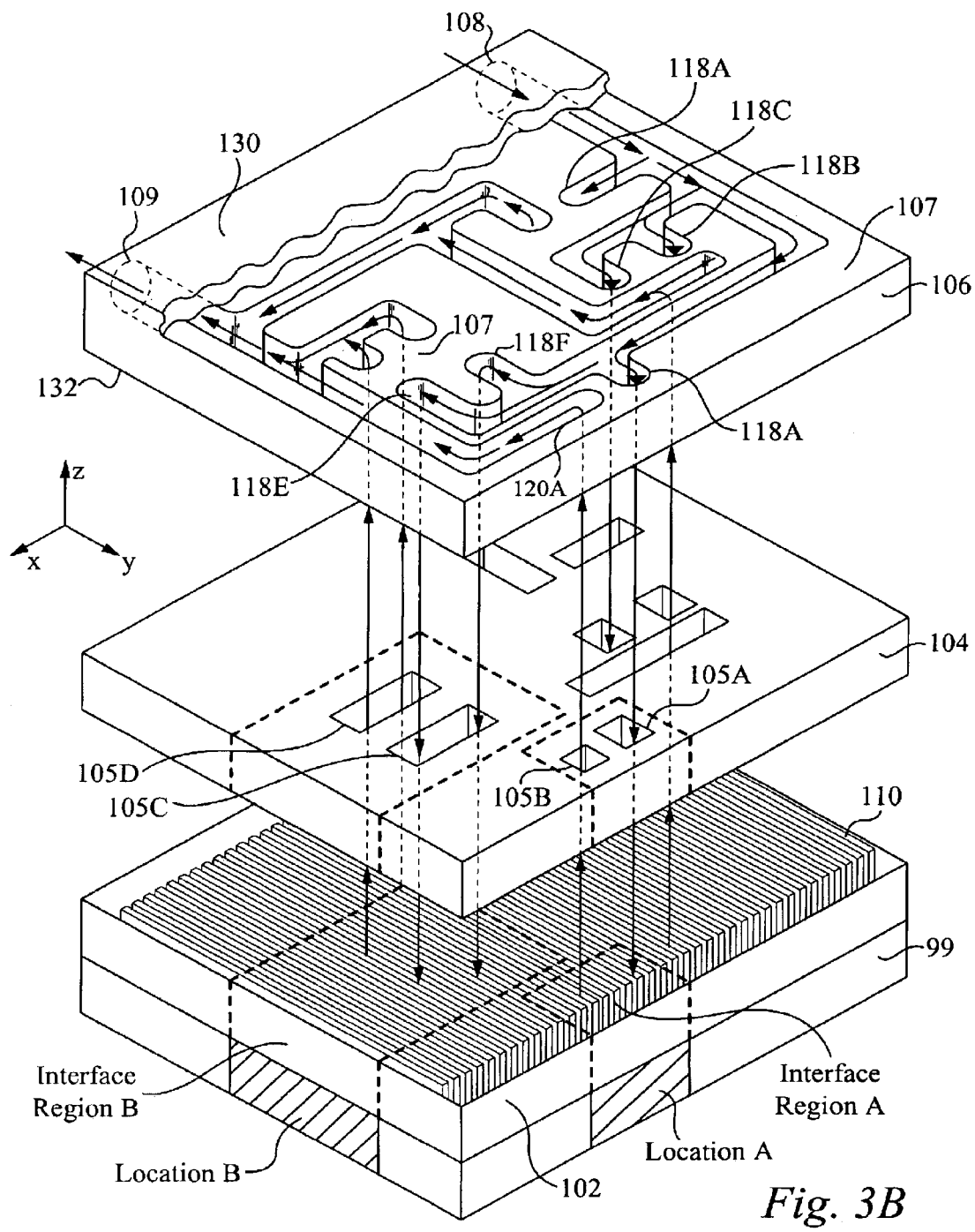
FIG. 3B illustrates an exploded view of the preferred heat exchanger with the preferred manifold layer in accordance with the present invention.

FIG. 3B illustrates an exploded view of the preferred three tier heat exchanger 100 with the preferred manifold layer in accordance with the present invention. The preferred embodiment, as shown in FIG. 3B, is a three level heat exchanger 100 which includes an interface layer 102, at least one intermediate layer 104 and at least one manifold layer 106. Alternatively, as discussed below, the heat exchanger 100 is a two level apparatus which includes the interface layer 102 and the manifold layer 106. As shown in FIGS. 2A and 2B, the heat exchanger 100 is coupled to a heat source 99, such as an electronic device including, but not limited to a microchip and integrated circuit, whereby a thermal interface material 98 is preferably disposed between the heat source 99 and the heat exchanger 100. Alternatively, the heat exchanger 100 is directly coupled to the surface of the heat source 99. It is also apparent to one skilled in the art that the heat exchanger 100 is alternatively integrally formed into the heat source 99, whereby the heat exchanger 100 and the heat source 99 are formed as one piece. Thus, the interface layer 102 is integrally disposed with the heat source 99 and is formed as one piece with the heat source.

It is preferred that the heat exchanger 100 of the present invention is configured to be directly or indirectly in contact with the heat source 99 which is rectangular in shape, as shown in the figures. However, it is apparent to one skilled in the art that the heat exchanger 100 can have any other shape conforming with the shape of the heat source 99. For example, the heat exchanger of the present invention can be configured to have an outer semicircular shape which allows the heat exchanger (not shown) to be in direct or indirect contact with a corresponding semicircular shaped heat source (not shown). In addition, it is preferred that the heat exchanger 100 is slightly larger in dimension than the heat source within the range of and including 0.5–5.0 millimeters.

FIG. 3A illustrates a top view of the preferred manifold layer 106 of the present invention. In particular, as shown in FIG. 3B, the manifold layer 106 includes four sides as well as a top surface 130 and a bottom surface 132. However, the top surface 130 is removed in FIG. 3A to adequately illustrate and describe the workings of the manifold layer 106. As shown in FIG. 3A, the manifold layer 106 has a series of channels or passages 116, 118, 120, 122 as well as ports 108, 109 formed therein. Preferably, the fingers 118, 120 extend completely through the body of the manifold layer 106 in the Z-direction, as shown in FIG. 3B. Alternatively, the fingers 118 and 120 extend partially through the manifold layer 106 in the Z-direction and have apertures as shown in FIG. 3A. In addition, passages 116 and 122 preferably extend partially through the manifold layer 106. The remaining areas between the inlet and outlet passages 116, 120, designated as 107, preferably extend from the top surface 130 to the bottom surface 132 and form the body of the manifold layer 106.

As shown in FIG. 3A, the fluid enters the manifold layer 106 via the inlet port 108 and flows along the inlet channel 116 to several fingers 118 which branch out from the channel 116 in several X and Y directions to apply fluid to selected regions in the interface layer 102. The fingers 118 are preferably arranged in different predetermined directions to deliver fluid to the locations in the interface layer 102 corresponding to the areas at and near the hot spots in the heat source. These locations in the interface layer 102 are hereinafter referred to as interface hot spot regions. The fingers are configured to cool stationary interface hot spot regions as well as temporally varying interface hot spot regions. As shown in FIG. 3A, the channels 116, 122 and fingers 118, 120 are preferably disposed in the X and Y directions in the manifold layer 106 and extend in the Z direction to allow circulation between the manifold layer 106 and the interface layer 102. Thus, the various directions of the channels 116, 122 and fingers 118, 120 allow delivery of fluid to cool hot spots in the heat source 99 and/or minimize pressure drop within the heat exchanger 100. Alternatively, channels 116, 122 and fingers 118, 120 are periodically disposed in the manifold layer 106 and exhibit a pattern, as in the example shown in FIGS. 4 and 5.

The arrangement as well as the dimensions of the fingers 118, 120 are determined in light of the hot spots in the heat source 99 that are desired to be cooled. The locations of the hot spots as well as the amount of heat produced near or at each hot spot are used to configure the manifold layer 106 such that the fingers 118, 120 are placed above or proximal to the interface hot spot regions in the interface layer 102. The manifold layer 106 preferably allows one phase and/or two-phase fluid to circulate to the interface layer 102 without allowing a substantial pressure drop from occurring within the heat exchanger 100 and the system 30 (FIG. 2A). The fluid delivery to the interface hot spot regions creates a uniform temperature at the interface hot spot region as well as areas in the heat source adjacent to the interface hot spot regions.

The dimensions as well as the number of channels 116 and fingers 118 depend on a number of factors. In one embodiment, the inlet and outlet fingers 118, 120 have the same width dimensions. Alternatively, the inlet and outlet fingers 118, 120 have different width dimensions. The width dimensions of the fingers 118, 120 are preferably within the range of and including 0.25–0.50 millimeters. In one embodiment, the inlet and outlet fingers 118, 120 have the same length and depth dimensions. Alternatively, the inlet and outlet fingers 118, 120 have different length and depth dimensions. In another embodiment, the inlet and outlet fingers 118, 120 have varying width dimensions along the length of the fingers. The length dimensions of the inlet and outlet fingers 118, 120 are within the range of and including 0.5 millimeters to three times the size of the heat source length. In addition, the fingers 118, 120 have a height or depth dimension within the range and including 0.25–0.50 millimeters. In addition, it is preferred that less than 10 or more than 30 fingers per centimeter are disposed in the manifold layer 106. However, it is apparent to one skilled in the art that between 10 and 30 fingers per centimeter in the manifold layer is also contemplated.

It is contemplated within the present invention to tailor the geometries of the fingers 118, 120 and channels 116, 122 to be in non-periodic arrangement to aid in optimizing hot spot cooling of the heat source. In order to achieve a uniform temperature across the heat source 99, the spatial distribution of the heat transfer to the fluid is matched with the spatial distribution of the heat generation. As the fluid flows along the interface layer 102, its temperature increases and as it begins to transform to vapor under two-phase conditions. Thus, the fluid undergoes a significant expansion which results in a large increase in velocity. Generally, the efficiency of the heat transfer from the interface layer to the fluid is improved for high velocity flow. Therefore, it is possible to tailor the efficiency of the heat transfer to the fluid by adjusting the cross-sectional dimensions of the fluid delivery and removal fingers 118, 120 and channels 116, 122 in the heat exchanger 100.

For example, a particular finger can be designed for a heat source where there is higher heat generation near the inlet. In addition, it may be advantageous to design a larger cross section for the regions of the fingers 118, 120 and channels 116, 122 where a mixture of fluid and vapor is expected. Although not shown, a finger can be designed to start out with a small cross sectional area at the inlet to cause high velocity flow of fluid. The particular finger or channel can also be configured to expand to a larger cross-section at a downstream outlet to cause a lower velocity flow. This design of the finger or channel allows the heat exchanger to minimize pressure drop and optimize hot spot cooling in areas where the fluid increases in volume, acceleration and velocity due to transformation from liquid to vapor in two-phase flow.

In addition, the fingers 118, 120 and channels 116, 122 can be designed to widen and then narrow again along their length to increase the velocity of the fluid at different places in the microchannel heat exchanger 100. Alternatively, it may be appropriate to vary the finger and channel dimensions from large to small and back again many times over in order to tailor the heat transfer efficiency to the expected heat dissipation distribution across the heat source 99. It should be noted that the above discussion of the varying dimensions of the fingers and channels also apply to the other embodiments discussed and is not limited to this embodiment.

Alternatively, as shown in FIG. 3A, the manifold layer 106 includes one or more apertures 119 in the inlet fingers 118. Preferably, in the three tier heat exchanger 100, the fluid flowing along the fingers 118 flows down the apertures 119 to the intermediate layer 104. Alternatively, in the two-tier heat exchanger 100, the fluid flowing along the fingers 118 flows down the apertures 119 directly to the interface layer 102. In addition, as shown in FIG. 3A, the manifold layer 106 includes apertures 121 in the outlet fingers 120. Preferably, in the three tier heat exchanger 100, the fluid flowing from the intermediate layer 104 flows up the apertures 121 into the outlet fingers 120. Alternatively, in the two-tier heat exchanger 100, the fluid flowing from the interface layer 102 flows directly up the apertures 121 into the outlet fingers 120.

In the preferred embodiment, the inlet and outlet fingers 118, 120 are open channels which do not have apertures. The bottom surface 103 of the manifold layer 106 abuts against the top surface of the intermediate layer 104 in the three tier exchanger 100 or abuts against the interface layer 102 in the two tier exchanger. Thus, in the three-tier heat exchanger 100, fluid flows freely to and from the intermediate layer 104 and the manifold layer 106. The fluid is directed to and from the appropriate interface hot spot region by conduits 105 in the intermediate layer 104. It is apparent to one skilled in the art that the conduits 105 are directly aligned with the fingers, as described below or positioned elsewhere in the three tier system.

Although FIG. 3B shows the preferred three tier heat exchanger 100 with the preferred manifold layer, the heat exchanger 100 is alternatively a two layer structure which includes the manifold layer 106 and the interface layer 102, whereby fluid passes directly between the manifold layer 106 and interface layer 102 without passing through the interface layer 104. It is apparent to one skilled in the art that the configuration of the manifold, intermediate and interface layers are shown for exemplary purposes and is thereby not limited to the configuration shown.

As shown in FIG. 3B, the intermediate layer 104 preferably includes a plurality of conduits 105 which extend therethrough. The inflow conduits 105 direct fluid entering from the manifold layer 106 to the designated interface hot spot regions in the interface layer 102. Similarly, the apertures 105 also channel fluid flow from the interface layer 102 to the exit fluid port(s) 109. Thus, the intermediate layer 104 also provides fluid delivery from the interface layer 102 to the exit fluid port 109 where the exit fluid port 108 is in communication with the manifold layer 106.

The conduits 105 are positioned in the interface layer 104 in a predetermined pattern based on a number of factors including, but not limited to, the locations of the interface hot spot regions, the amount of fluid flow needed in the interface hot spot region to adequately cool the heat source 99 and the temperature of the fluid. Preferably the conduits have a width dimension of 100 microns, although other width dimensions are contemplated up to several millimeters. In addition, the conduits 105 have other dimensions dependent on at least the above mentioned factors. It is apparent to one skilled in the art that each conduit 105 in the intermediate layer 104 has the same shape and/or dimension, although it is not necessary. For instance, like the fingers described above, the conduits alternatively have a varying length and/or width dimension. Additionally, the conduits 105 may have a constant depth or height dimension through the intermediate layer 104. Alternatively, the conduits 105 have a varying depth dimension, such as a trapezoidal or a nozzle-shape, through the intermediate layer 104. Although the horizontal shape of the conduits 105 are shown to be rectangular in FIG. 2C, the conduits 105 alternatively have any other shape including, but not limited to, circular (FIG. 3A), curved and elliptical. Alternatively, one or more of the conduits 105 are shaped and contour with a portion of or all of the finger or fingers above.

The intermediate layer 104 is preferably horizontally positioned within the heat exchanger 100 with the conduits 105 positioned vertically. Alternatively, the intermediate layer 104 is positioned in any other direction within the heat exchanger 100 including, but not limited to, diagonal and curved forms. Alternatively, the conduits 105 are positioned within the intermediate layer 104 in a horizontally, diagonally, curved or any other direction. In addition, the intermediate layer 104 preferably extends horizontally along the entire length of the heat exchanger 100, whereby the intermediate layer 104 completely separates the interface layer 102 from the manifold layer 106 to force the fluid to be channeled through the conduits 105. Alternatively, a portion of the heat exchanger 100 does not include the intermediate layer 104 between the manifold layer 106 and the interface layer 102, whereby fluid is free to flow therebetween. Further, the intermediate layer 104 alternatively extends vertically between the manifold layer 106 and the interface layer 102 to form separate, distinct intermediate layer regions. Alternatively, the intermediate layer 104 does not fully extend from the manifold layer 106 to interface layer 102.

FIG. 3B illustrates a perspective view of the preferred interface layer 102 in accordance with the present invention. As shown in FIG. 3B, the interface layer 102 includes a bottom surface 103 and preferably a plurality of microchannel walls 110, whereby the area in between the microchannel walls 110 channels or directs fluid along a fluid flow path. The bottom surface 103 is preferably flat and has a high thermal conductivity to allow sufficient heat transfer from the heat source 99. Alternatively, the bottom surface 103 includes troughs and/or crests designed to collect or repel fluid from a particular location. The microchannel walls 110 are preferably configured in a parallel configuration, as shown in FIG. 3B, whereby fluid preferably flows between the microchannel walls 110 along a fluid path. Alternatively, the microchannel walls 110 have non-parallel configurations.

Figure 10:
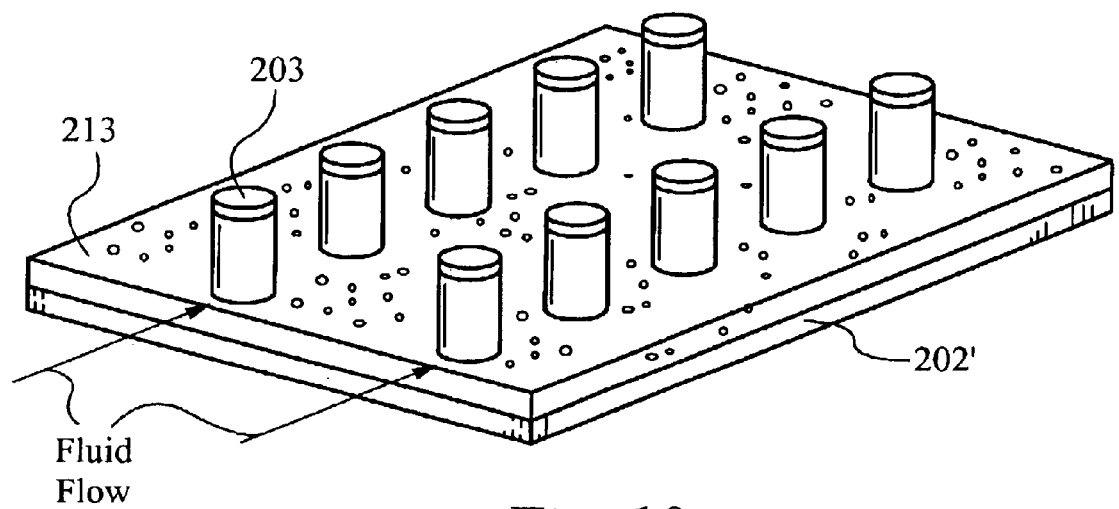
FIG. 10 illustrates a perspective view of the interface layer having a micro-pin array in accordance with the present invention.

It is apparent to one skilled in the art that the microchannel walls 110 are alternatively configured in any other appropriate configuration depending on the factors discussed above. For instance, the interface layer 102 alternatively has grooves in between sections of microchannel walls 110, as shown in FIG. 8C. In addition, the microchannel walls 110 have dimensions which minimize the pressure drop or differential within the interface layer 102. It is also apparent that any other features, besides microchannel walls 110 are also contemplated, including, but not limited to, pillars 203 (FIG. 10), roughed surfaces, and a micro-porous structure, such as sintered metal and silicon foam 213 (FIG. 10) or a combination. However, for exemplary purposes, the parallel microchannel walls 110 shown in FIG. 3B is used to describe the interface layer 102 in the present invention.

The microchannel walls 110 allow the fluid to undergo thermal exchange along the selected hot spot locations of the interface hot spot region to cool the heat source 99 in that location. The microchannel walls 110 preferably have a width dimension within the range of 20–300 microns and a height dimension within the range of 100 microns to one millimeter, depending on the power of the heat source 99. The microchannel walls 110 preferably have a length dimension which ranges between 100 microns and several centimeters, depending on the dimensions of the heat source, as well as the size of the hot spots and the heat flux density from the heat source. Alternatively, any other microchannel wall dimensions are contemplated. The microchannel walls 110 are preferably spaced apart by a separation dimension range of 50–500 microns, depending on the power of the heat source 99, although any other separation dimension range is contemplated.

Referring back to the assembly in FIG. 3B, the top surface of the manifold layer 106 is cut away to illustrate the channels 116, 122 and fingers 118, 120 within the body of the manifold layer 106. The locations in the heat source 99 that produce more heat are hereby designated as hot spots, whereby the locations in the heat source 99 which produce less heat are hereby designated as warm spots. As shown in FIG. 3B, the heat source 99 is shown to have a hot spot region, namely at location A, and a warm spot region, namely at location B. The areas of the interface layer 102 which abut the hot and warm spots are accordingly designated interface hot spot regions. As shown in FIG. 3B, the interface layer 102 includes interface hot spot region A, which is positioned above location A and interface hot spot region B, which is positioned above location B.

As shown in FIGS. 3A and 3B, fluid initially enters the heat exchanger 100 preferably through one inlet port 108. The fluid then preferably flows to one inlet channel 116. Alternatively, the heat exchanger 100 includes more than one inlet channel 116. As shown in FIGS. 3A and 3B, fluid flowing along the inlet channel 116 from the inlet port 108 initially branches out to finger 118D. In addition, the fluid which continues along the rest of the inlet channel 116 flows to individual fingers 118B and 118C and so on.

In FIG. 3B, fluid is supplied to interface hot spot region A by flowing to the finger 118A, whereby fluid preferably flows down through finger 118A to the intermediate layer 104. The fluid then flows through the inlet conduit 105A, preferably positioned below the finger 118A, to the interface layer 102, whereby the fluid undergoes thermal exchange with the heat source 99. The fluid travels along the microchannels 110 as shown in FIG. 3B, although the fluid may travel in any other direction along the interface layer 102. The heated liquid then travels upward through the conduit 105B to the outlet finger 120A. Similarly, fluid flows down in the Z-direction through fingers 118E and 118F to the intermediate layer 104. The fluid then flows through the inlet conduit 105C down in the Z-direction to the interface layer 102. The heated fluid then travels upward in the Z-direction from the interface layer 102 through the outlet conduit 105D to the outlet fingers 120E and 120F. The heat exchanger 100 removes the heated fluid in the manifold layer 106 via the outlet fingers 120, whereby the outlet fingers 120 are in communication with the outlet channel 122. The outlet channel 122 allows fluid to flow out of the heat exchanger preferably through one outlet port 109.

It is preferred that the inflow and outflow conduits 105 are also positioned directly or nearly directly above the appropriate interface hot spot regions to directly apply fluid to hot spots in the heat source 99. In addition, each outlet finger 120 is preferably configured to be positioned closest to a respective inlet finger 119 for a particular interface hot spot region to minimize pressure drop therebetween. Thus, fluid enters the interface layer 102 via the inlet finger 118A and travels the least amount of distance along the bottom surface 103 of the interface layer 102 before it exits the interface layer 102 to the outlet finger 120A. It is apparent that the amount of distance which the fluid travels along the bottom surface 103 adequately removes heat generated from the heat source 99 without generating an unnecessary amount of pressure drop. In addition, as shown in FIGS. 3A and 3B, the corners in the fingers 118, 120 are preferably curved to reduce pressure drop of the fluid flowing along the fingers 118.

It is apparent to one skilled in the art that the configuration of the manifold layer 106 shown in FIGS. 3A and 3B is only for exemplary purposes. The configuration of the channels 116 and fingers 118 in the manifold layer 106 depend on a number of factors, including but not limited to, the locations of the interface hot spot regions, amount of flow to and from the interface hot spot regions as well as the amount of heat produced by the heat source in the interface hot spot regions. For instance, one possible configuration of the manifold layer 106 includes an interdigitated pattern of parallel inlet and outlet fingers that are alternatively arranged along the width of the manifold layer, as shown in FIGS. 4–7A and discussed below. Nonetheless, any other configuration of channels 116 and fingers 118 is contemplated.

Figure 4:
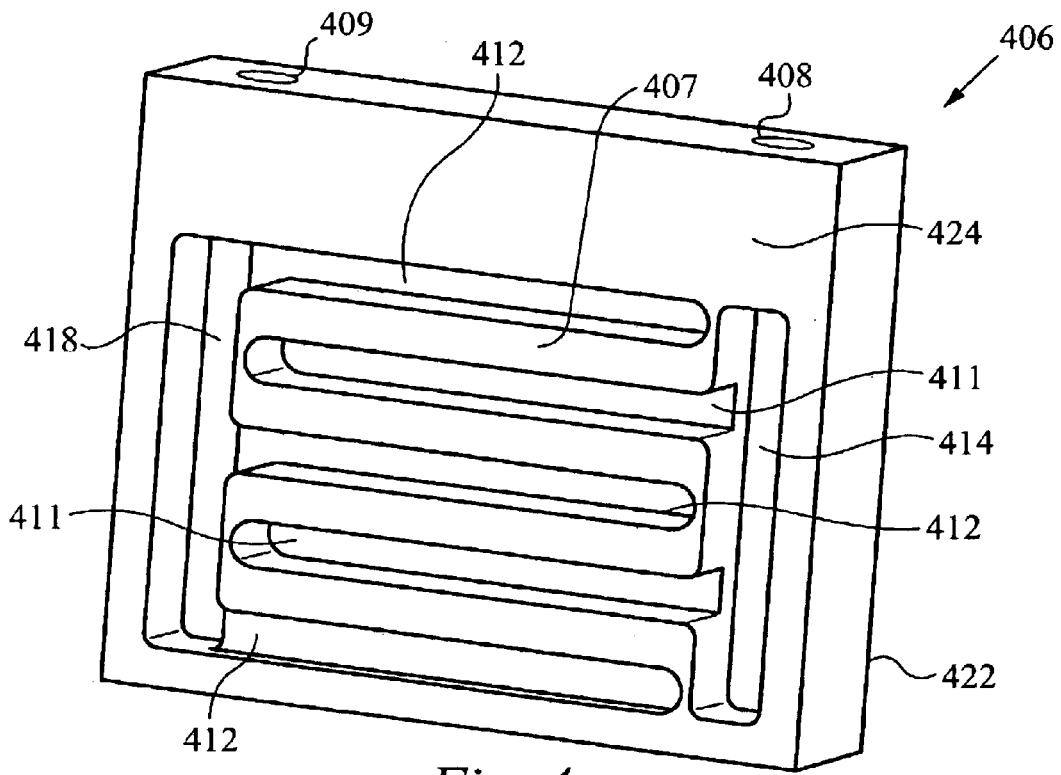
FIG. 4 illustrates a perspective view of the an interwoven manifold layer in accordance with the present invention.

FIG. 4 illustrates a perspective view of an alternative manifold layer 406 in accordance with the heat exchanger of the present invention. The manifold layer 406 in FIG. 4 includes a plurality of interwoven or inter-digitated parallel fluid fingers 411, 412 which allow one phase and/or two-phase fluid to circulate to the interface layer 402 without allowing a substantial pressure drop from occurring within the heat exchanger 400 and the system 30 (FIG. 2A). As shown in FIG. 8, the inlet fingers 411 are arranged alternately with the outlet fingers 412. However, it is contemplated by one skilled in the art that a certain number of inlet or outlet fingers can be arranged adjacent to one another and is thereby not limited to the alternating configuration shown in FIG. 4. In addition, the fingers are alternatively designed such that a parallel finger branches off from or is linked to another parallel finger. Thus, it is possible to have many more inlet fingers than outlet fingers and vice versa.

The inlet fingers or passages 411 supply the fluid entering the heat exchanger to the interface layer 402, and the outlet fingers or passages 412 remove the fluid from the interface layer 402 which then exits the heat exchanger 400. The shown configuration of the manifold layer 406 allows the fluid to enter the interface layer 402 and travel a very short distance in the interface layer 402 before it enters the outlet passage 412. The substantial decrease in the length that the fluid travels along the interface layer 402 substantially decreases the pressure drop in the heat exchanger 400 and the system 30 (FIG. 2A).

Figure 5:
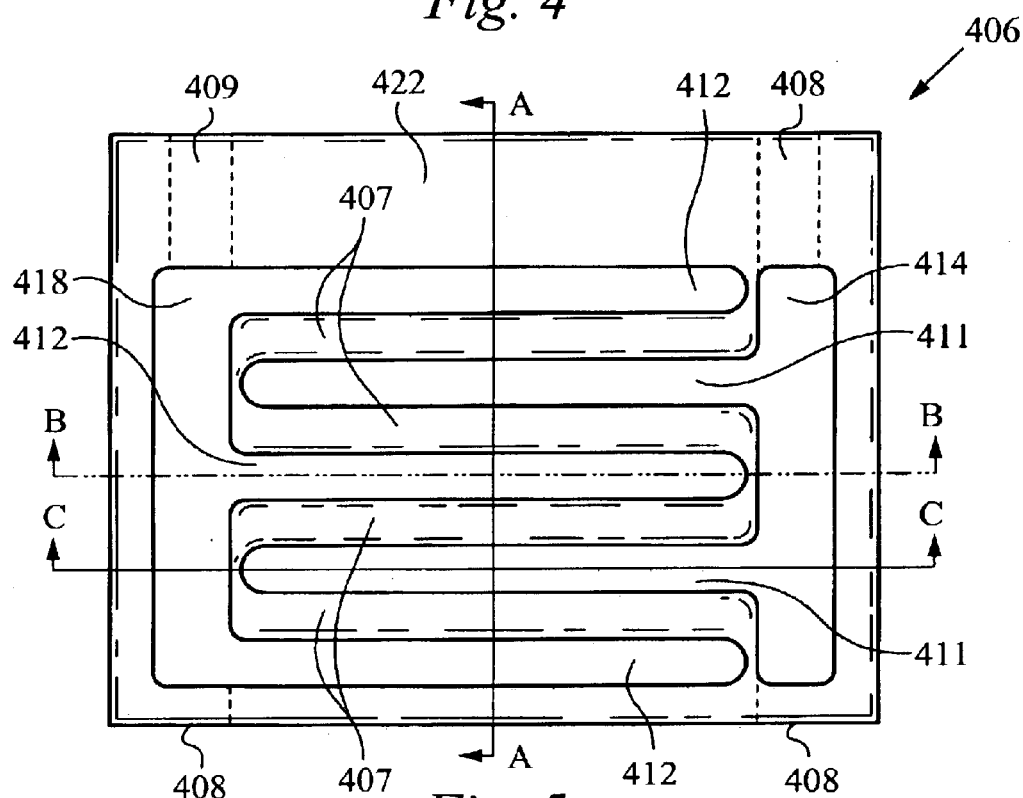
FIG. 5 illustrates a top view of the interwoven manifold layer with interface layer in accordance with the present invention.

As shown in FIGS. 4–5, the alternative manifold layer 406 includes a passage 414 which is in communication with two inlet passages 411 and provides fluid thereto. As shown in FIGS. 8–9 the manifold layer 406 includes three outlet passages 412 which are in communication with passage 418. The passages 414 in the manifold layer 406 have a flat bottom surface which channels the fluid to the fingers 411, 412. Alternatively, the passage 414 has a slight slope which aids in channeling the fluid to selected fluid passages 411. Alternatively, the inlet passage 414 includes one or more apertures in its bottom surface which allows a portion of the fluid to flow down to the interface layer 402. Similarly, the passage 418 in the manifold layer has a flat bottom surface which contains the fluid and channels the fluid to the port 408. Alternatively, the passage 418 has a slight slope which aids in channeling the fluid to selected outlet ports 408. In addition, the passages 414, 418 have a dimension width of approximately 2 millimeters, although any other width dimensions are alternatively contemplated.

The passages 414, 418 are in communication with ports 408, 409 whereby the ports are coupled to the fluid lines 38 in the system 30 (FIG. 2A). The manifold layer 406 includes horizontally configured fluid ports 408, 409. Alternatively, the manifold layer 406 includes vertically and/or diagonally configured fluid ports 408, 409, as discussed below, although not shown in FIGS. 4–7. Alternatively, the manifold layer 406 does not include passage 414. Thus, fluid is directly supplied to the fingers 411 from the ports 408. Again, the manifold layer 411 alternatively does not include passage 418, whereby fluid in the fingers 412 directly flows out of the heat exchanger 400 through ports 408. It is apparent that although two ports 408 are shown in communication with the passages 414, 418, any other number of ports are alternatively utilized.

The inlet passages 411 have dimensions which allow fluid to travel to the interface layer without generating a large pressure drop along the passages 411 and the system 30 (FIG. 2A). The inlet passages 411 have a width dimension in the range of and including 0.25–5.00 millimeters, although any other width dimensions are alternatively contemplated. In addition, the inlet passages 411 have a length dimension in the range of and including 0.5 millimeters to three times the length of the heat source. Alternatively, other length dimensions are contemplated. In addition, as stated above, the inlet passages 411 extend down to or slightly above the height of the microchannels 410 such that the fluid is channeled directly to the microchannels 410. The inlet passages 411 have a height dimension in the range of and including 0.25–5.00 millimeters. It is apparent to one skilled in the art that the passages 411 do not extend down to the microchannels 410 and that any other height dimensions are alternatively contemplated. It is apparent to one skilled in the art that although the inlet passages 411 have the same dimensions, it is contemplated that the inlet passages 411 alternatively have different dimensions. In addition, the inlet passages 411 are alternatively non-periodic such that they have varying widths, cross sectional dimensions and/or distances between adjacent fingers. In particular, the passage 411 has areas with a larger width or depths as well as areas with narrower widths and depths along its length. The varied dimensions allow more fluid to be delivered to predetermined interface hot spot regions in the interface layer 402 through wider portions while restricting flow to warm spot interface hot spot regions through the narrow portions.

In addition, the outlet passages 412 have dimensions which allow fluid to travel to the interface layer without generating a large pressure drop along the passages 412 as well as the system 30 (FIG. 2A). The outlet passages 412 have a width dimension in the range of and including 0.25–5.00 millimeters, although any other width dimensions are alternatively contemplated. In addition, the outlet passages 412 have a length dimension in the range of and including 0.5 millimeters to three times the length of the heat source. In addition, the outlet passages 412 extend down to the height of the microchannels 410 such that the fluid easily flows upward in the outlet passages 412 after horizontally flowing along the microchannels 410. The inlet passages 411 have a height dimension in the range of and including 0.25–5.00 millimeters, although any other height dimensions are alternatively contemplated. It is apparent to one skilled in the art that although outlet passages 412 have the same dimensions, it is contemplated that the outlet passages 412 alternatively have different dimensions. Again, the inlet passage 412 alternatively have varying widths, cross sectional dimensions and/or distances between adjacent fingers.

The inlet and outlet passages 411, 412 are segmented and distinct from one another, as shown in FIGS. 4 and 5, whereby fluid among the passages do not mix together. In particular, as shown in FIG. 8, two outlet passages are located along the outside edges of the manifold layer 406, and one outlet passage 412 is located in the middle of the manifold layer 406. In addition, two inlet passages 411 are configured on adjacent sides of the middle outlet passage 412. This particular configuration causes fluid entering the interface layer 402 to travel the shortest distance in the interface layer 402 before it flows out of the interface layer 402 through the outlet passage 412. However, it is apparent to one skilled in the art that the inlet passages and outlet passages may be positioned in any other appropriate configuration and is thereby not limited to the configuration shown and described in the present disclosure. The number of inlet and outlet fingers 411, 412 are more than three within the manifold layer 406 but less than 10 per centimeter across the manifold layer 406. It is also apparent to one skilled in the art that any other number of inlet passages and outlet passages may be used and thereby is not limited to the number shown and described in the present disclosure.

Figure 6A:
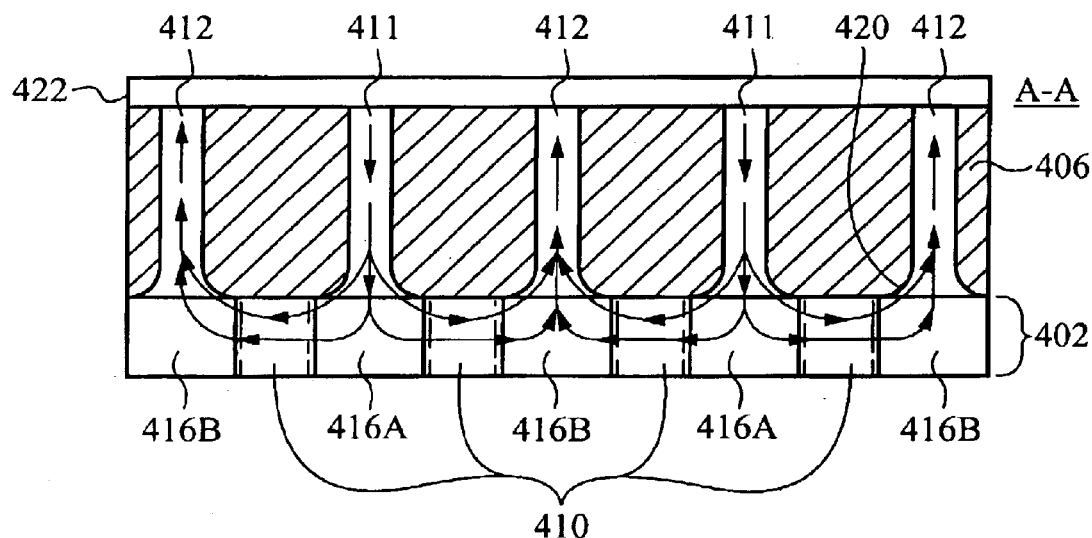
FIG. 6A illustrates a cross-sectional view of the interwoven manifold layer with interface layer of the present invention along lines A—A.
Figure 6B:
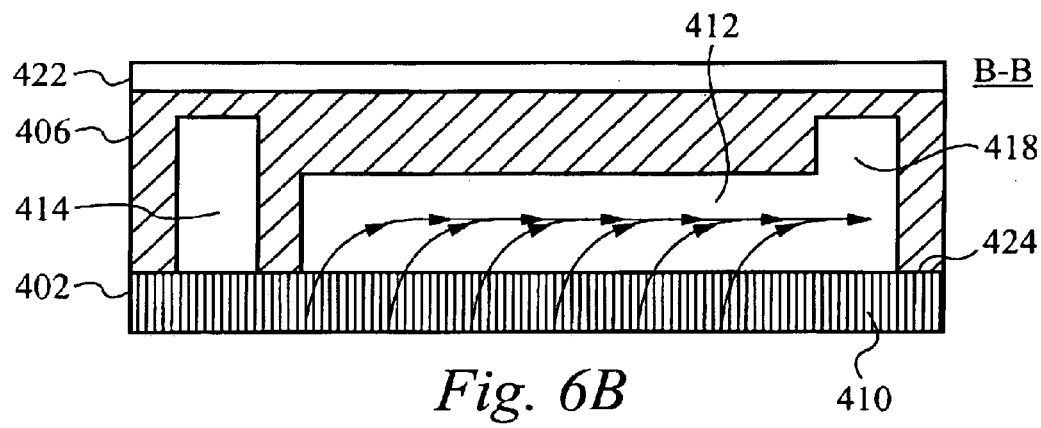
FIG. 6B illustrates a cross-sectional view of the interwoven manifold layer with interface layer of the present invention along lines B—B.
Figure 6C:
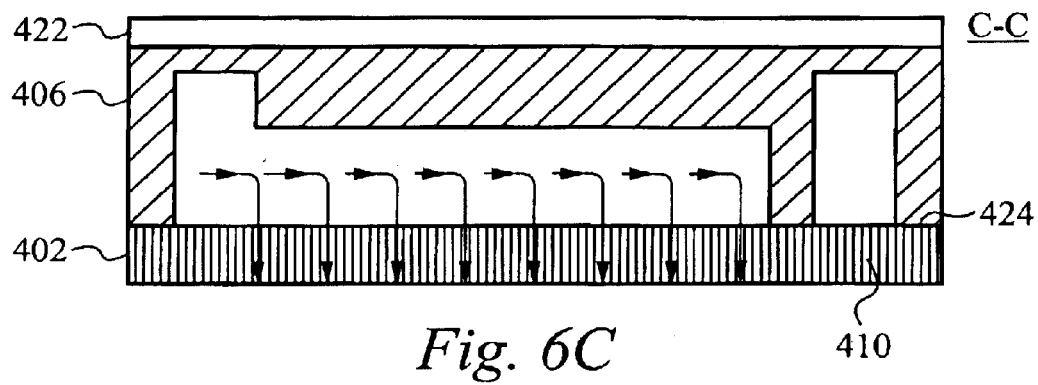
FIG. 6C illustrates a cross-sectional view of the interwoven manifold layer with interface layer of the present invention along lines C—C.
Figure 7A:
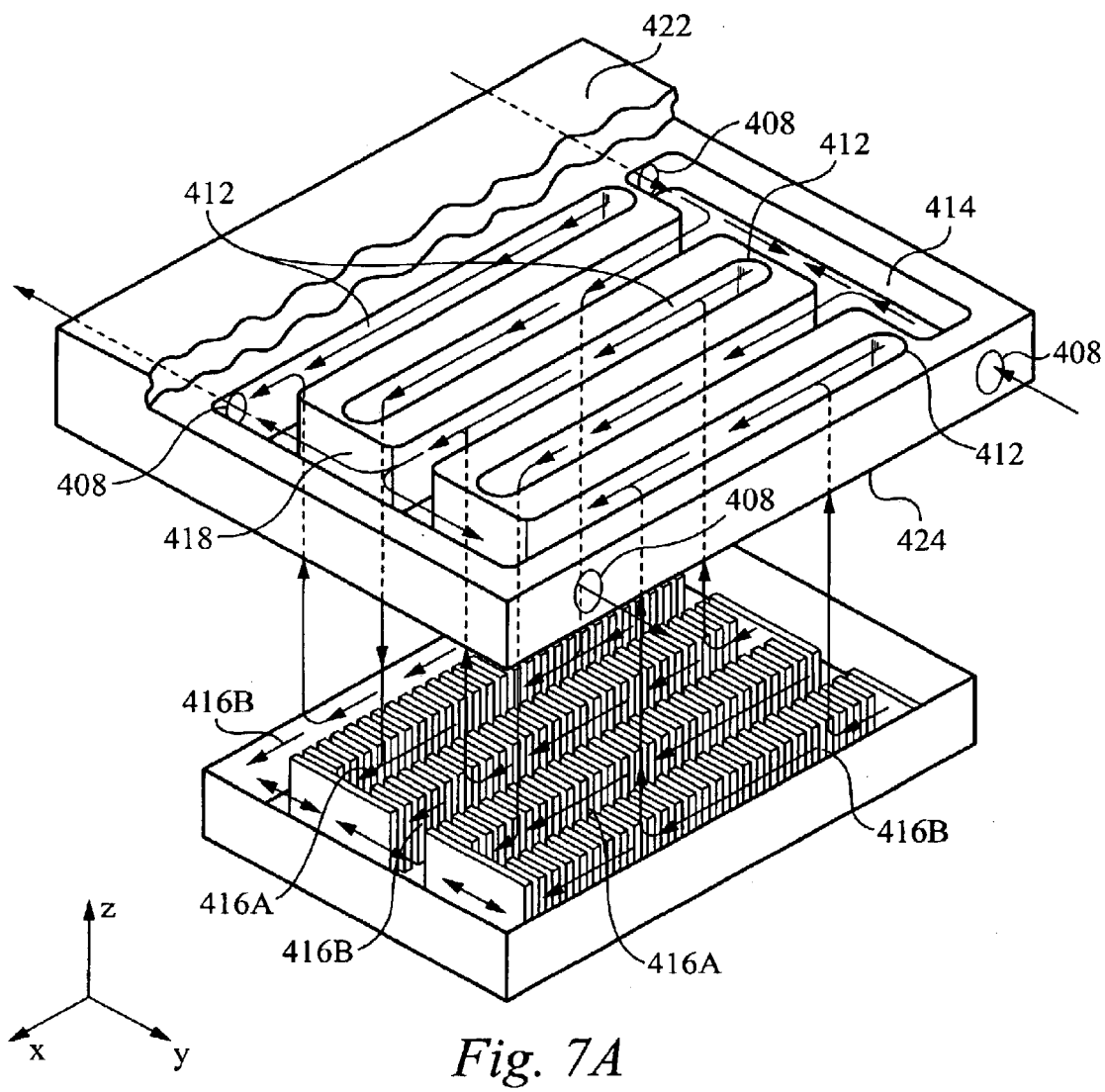
FIG. 7A illustrates an exploded view of the interwoven manifold layer with interface layer of the present invention.

The manifold layer 406 is coupled to the intermediate layer (not shown), whereby the intermediate layer (not shown) is coupled to the interface layer 402 to form a three-tier heat exchanger 400. The intermediate layer discussed herein is referred to above in the embodiment shown in FIG. 3B. The manifold layer 406 is alternatively coupled to the interface layer 402 and positioned above the interface layer 402 to form a two-tier heat exchanger 400, as shown in FIG. 7A. FIGS. 6A–6C illustrate cross-sectional schematics of the preferred manifold layer 406 coupled to the interface layer 402 in the two tier heat exchanger. Specifically, FIG. 6A illustrates the cross section of the heat exchanger 400 along line A—A in FIG. 5. In addition, FIG. 6B illustrates the cross section of the heat exchanger 400 along line B—B and FIG. 6C illustrates the cross section of the heat exchanger 400 along line C—C in FIG. 5. As stated above, the inlet and outlet passages 411, 412 extend from the top surface to the bottom surface of the manifold layer 406. When the manifold layer 406 and the interface layer 402 are coupled to one another, the inlet and outlet passages 411, 412 are at or slightly above the height of the microchannels 410 in the interface layer 402. This configuration causes the fluid from the inlet passages 411 to easily flow from the passages 411 through the microchannels 410. In addition, this configuration causes fluid flowing through the microchannels to easily flow upward through the outlet passages 412 after flowing through the microchannels 410.

In the alternative embodiment, the intermediate layer 104 (FIG. 3B) is positioned between the manifold layer 406 and the interface layer 402, although not shown in the figures. The intermediate layer 104 (FIG. 3B) channels fluid flow to the designated interface hot spot regions in the interface layer 402. In addition, the intermediate layer 104 (FIG. 3B) can be utilized to provide a uniform flow of fluid entering the interface layer 402. Also, the intermediate layer 104 is utilized to provide fluid to the interface hot spot regions in the interface layer 402 to adequately cool hot spots and create temperature uniformity in the heat source 99. The inlet and outlet passages 411, 412 are positioned near or above hot spots in the heat source 99 to adequately cool the hot spots, although it is not necessary.

FIG. 7A illustrates an exploded view of the alternate manifold layer 406 with the an alternative interface layer 102 of the present invention. Preferably, the interface layer 102 includes continuous arrangements of microchannel walls 110, as shown in FIG. 3B. In general operation, similar to the preferred manifold layer 106 shown in FIG. 3B, fluid enters the manifold layer 406 at fluid port 408 and travels through the passage 414 and towards the fluid fingers or passages 411. The fluid enters the opening of the inlet fingers 411 and flows the length of the fingers 411 in the X-direction, as shown by the arrows. In addition, the fluid flows downward in the Z-direction to the interface layer 402 which is positioned below the manifold layer 406. As shown in FIG. 7A, the fluid in the interface layer 402 traverses along the bottom surface in the X and Y directions of the interface layer 402 and performs thermal exchange with the heat source 99. The heated fluid exits the interface layer 402 by flowing upward in the Z-direction via the outlet fingers 412, whereby the outlet fingers 412 channel the heated fluid to the passage 418 in the manifold layer 406 along the X-direction. The fluid then flows along the passage 418 and exits the heat exchanger by flowing out through the port 409.

The interface layer, as shown in FIG. 7A, includes a series of grooves 416 disposed in between sets of microchannels 410 which aid in channeling fluid to and from the passages 411, 412. In particular, the grooves 416A are located directly beneath the inlet passages 411 of the alternate manifold layer 406, whereby fluid entering the interface layer 402 via the inlet passages 411 is directly channeled to the microchannels adjacent to the groove 416A. Thus, the grooves 416A allow fluid to be directly channeled into specific designated flow paths from the inlet passages 411, as shown in FIG. 5. Similarly, the interface layer 402 includes grooves 416B which are located directly beneath the outlet passages 412 in the Z-direction. Thus, fluid flowing horizontally along the microchannels 410 toward the outlet passages are channeled horizontally to the grooves 416B and vertically to the outlet passage 412 above the grooves 416B.

FIG. 6A illustrates the cross section of the heat exchanger 400 with the manifold layer 406 and the interface layer 402. In particular, FIG. 6A shows the inlet passages 411 interwoven with the outlet passages 412, whereby fluid flows down the inlet passages 411 and up the outlet passages 412. In addition, as shown in FIG. 6A, the fluid flows horizontally through the microchannel walls 410 which are disposed between the inlet passages and outlet passages and separated by the grooves 416A, 416B. Alternatively, the microchannel walls are continuous (FIG. 3B) and are not separated by the grooves. As shown in FIG. 6A, either or both of the inlet and outlet passages 411, 412 preferably have a curved surface 420 at their ends at the location near the grooves 416. The curved surface 420 directs fluid flowing down the passage 411 towards the microchannels 410 which are located adjacent to the passage 411. Thus, fluid entering the interface layer 102 is more easily directed toward the microchannels 410 instead of flowing directly to the groove 416A. Similarly, the curved surface 420 in the outlet passages 412 assists in directing fluid from the microchannels 410 to the outer passage 412.

Figure 7B:
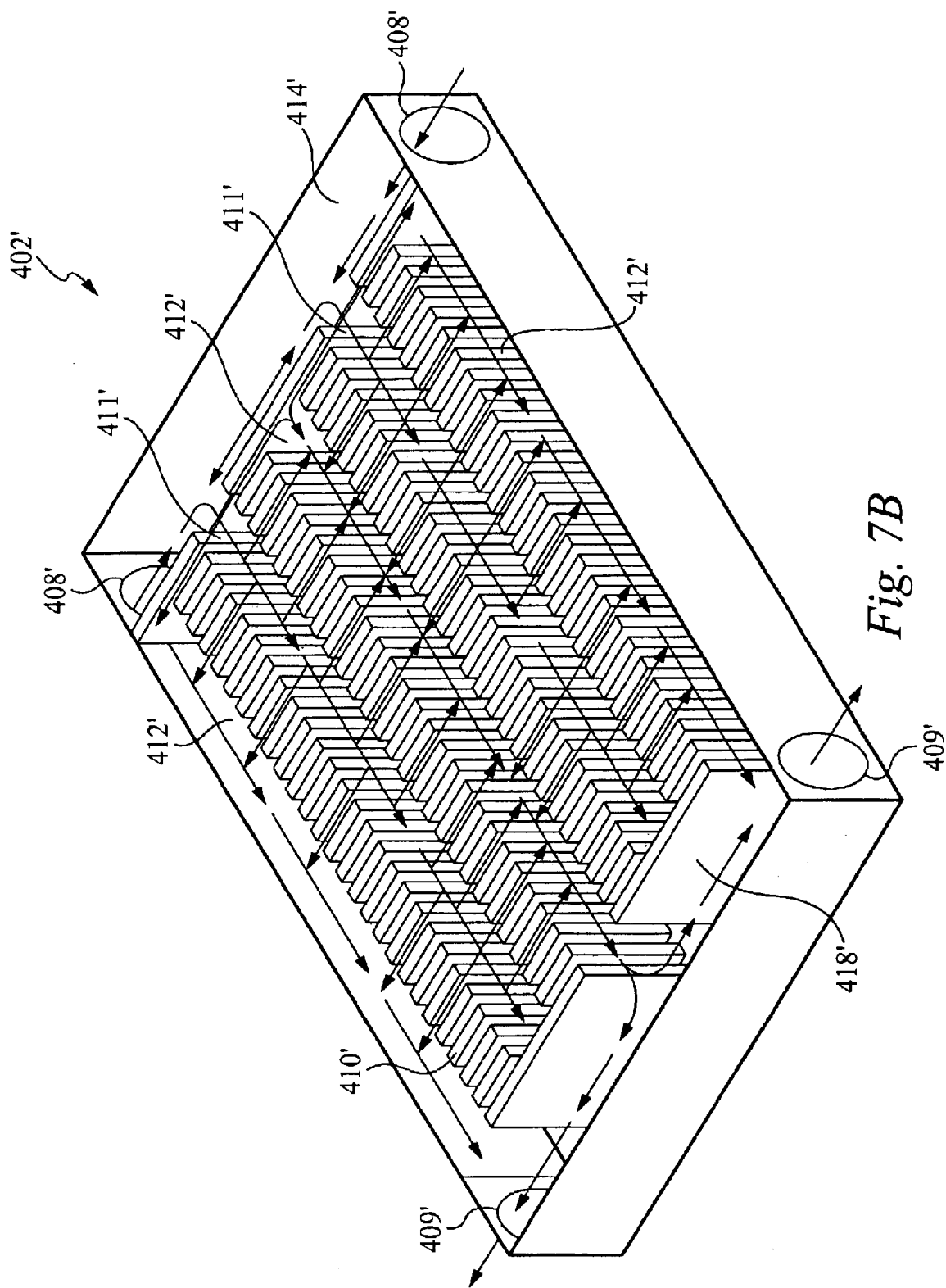
FIG. 7B illustrates a perspective view of an alternative embodiment of the interface layer of the present invention.

In an alternative embodiment, as shown in FIG. 7B, the interface layer 402' includes the inlet passages 411' and outlet passages 412' discussed above with respect to the manifold layer 406 (FIGS. 8–9). In the alternative embodiment, the fluid is supplied directly to the interface layer 402' from the port 408'. The fluid flows along the passage 414' towards the inlet passages 411'. The fluid then traverses laterally along the sets of microchannels 410' and undergoes heat exchange with the heat source (not shown) and flows to the outlet passages 412'. The fluid then flows along the outlet passages 412' to passage 418', whereby the fluid exits the interface layer 402' via the port 409'. The ports 408', 409' are configured in the interface layer 402' and are alternatively configured in the manifold layer 406 (FIG. 7A).

It is apparent to one skilled in the art that although all of the heat exchangers in the present application are shown to operate horizontally, the heat exchanger alternatively operates in a vertical position. While operating in the vertical position, the heat exchangers are alternatively configured such that each inlet passage is located above an adjacent outlet passage. Therefore, fluid enters the interface layer through the inlet passages and is naturally channeled to an outlet passage. It is also apparent that any other configuration of the manifold layer and interface layer is alternatively used to allow the heat exchanger to operate in a vertical position.

Figure 8A:
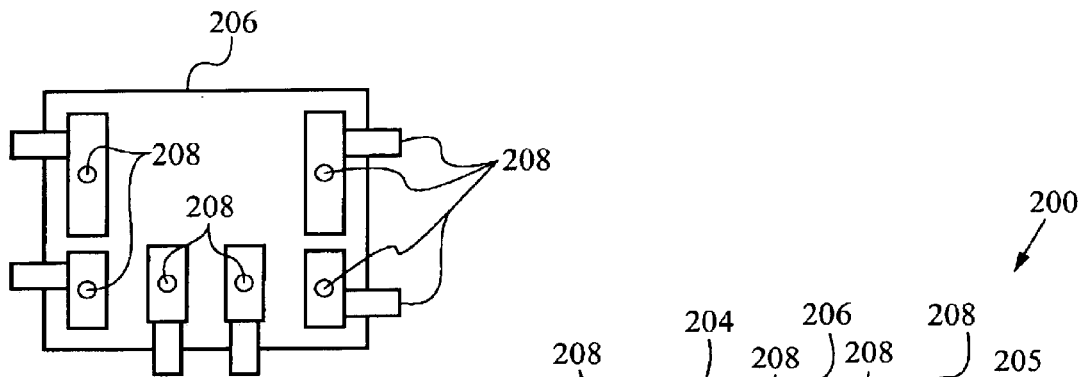
FIG. 8A illustrates a top view diagram of an alternate manifold layer in accordance with the present invention.
Figure 8B:
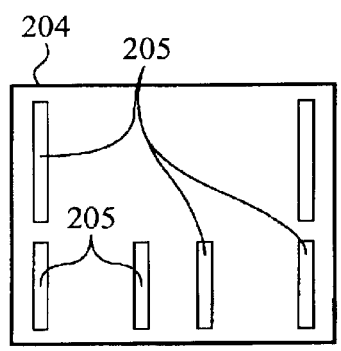
FIG. 8B illustrates a top view diagram of the interface layer in accordance with the present invention.
Figure 8C:
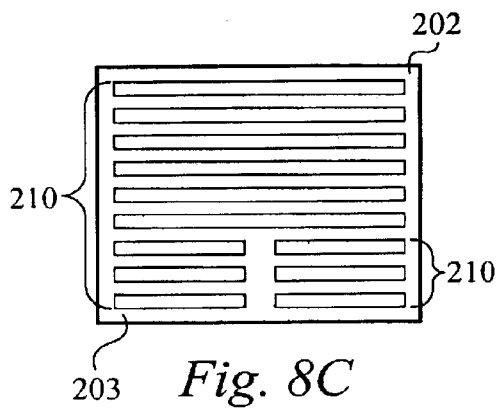
FIG. 8C illustrates a top view diagram of the interface layer in accordance with the present invention.

FIGS. 8A–8C illustrate top view diagrams of another alternate embodiment of the heat exchanger in accordance with the present invention. In particular, FIG. 8A illustrates a top view diagram of an alternate manifold layer 206 in accordance with the present invention. FIGS. 8B and 8C illustrate a top view of an intermediate layer 204 and interface layer 202. In addition, FIG. 9A illustrates a three tier heat exchanger utilizing the alternate manifold layer 206, whereas FIG. 9B illustrates a two-tier heat exchanger utilizing the alternate manifold layer 206.

Figure 9A:
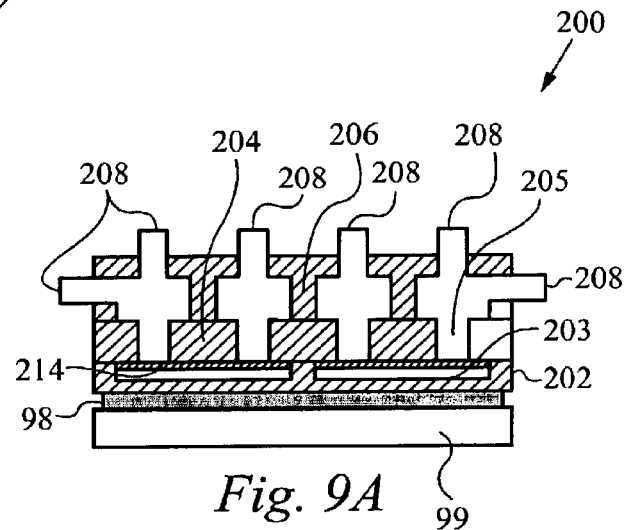
FIG. 9A illustrates a side view diagram of the alternative embodiment of the three tier heat exchanger in accordance with the present invention.
Figure 9B:
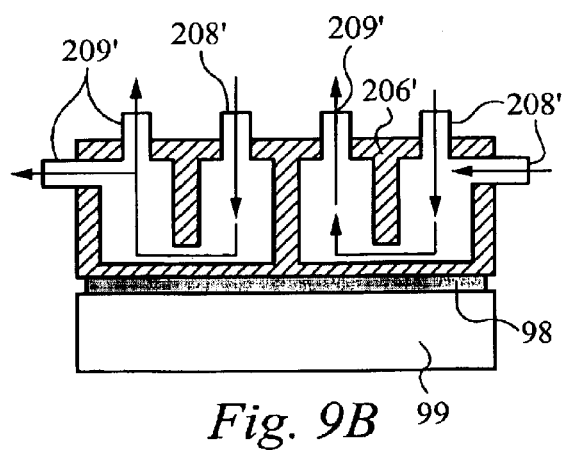
FIG. 9B illustrates a side view diagram of the alternative embodiment of the two tier heat exchanger in accordance with the present invention.

As shown in FIGS. 8A and 9A, the manifold layer 206 includes a plurality of fluid ports 208 configured horizontally and vertically. Alternatively, the fluid ports 208 are positioned diagonally or in any other direction with respect to the manifold layer 206. The fluid ports 208 are placed in selected locations in the manifold layer 206 to effectively deliver fluid to the predetermined interface hot spot regions in the heat exchanger 200. The multiple fluid ports 208 provide a significant advantage, because fluid can be directly delivered from a fluid port to a particular interface hot spot region without significantly adding to the pressure drop to the heat exchanger 200. In addition, the fluid ports 208 are also positioned in the manifold layer 206 to allow fluid in the interface hot spot regions to travel the least amount of distance to the exit port 208 such that the fluid achieves temperature uniformity while maintaining a minimal pressure drop between the inlet and outlet ports 208. Additionally, the use of the manifold layer 206 aids in stabilizing two phase flow within the heat exchanger 200 while evenly distributing uniform flow across the interface layer 202. It should be noted that more than one manifold layer 206 is alternatively included in the heat exchanger 200, whereby one manifold layer 206 routes the fluid into and out-of the heat exchanger 200 and another manifold layer (not shown) controls the rate of fluid circulation to the heat exchanger 200. Alternatively, all of the plurality of manifold layers 206 circulate fluid to selected corresponding interface hot spot regions in the interface layer 202.

The alternate manifold layer 206 has lateral dimensions which closely match the dimensions of the interface layer 202. In addition, the manifold layer 206 has the same dimensions of the heat source 99. Alternatively, the manifold layer 206 is larger than the heat source 99. The vertical dimensions of the manifold layer 206 are within the range of 0.1 and 10 millimeters. In addition, the apertures in the manifold layer 206 which receive the fluid ports 208 are within the range between 1 millimeter and the entire width or length of the heat source 99.

Figure 11:
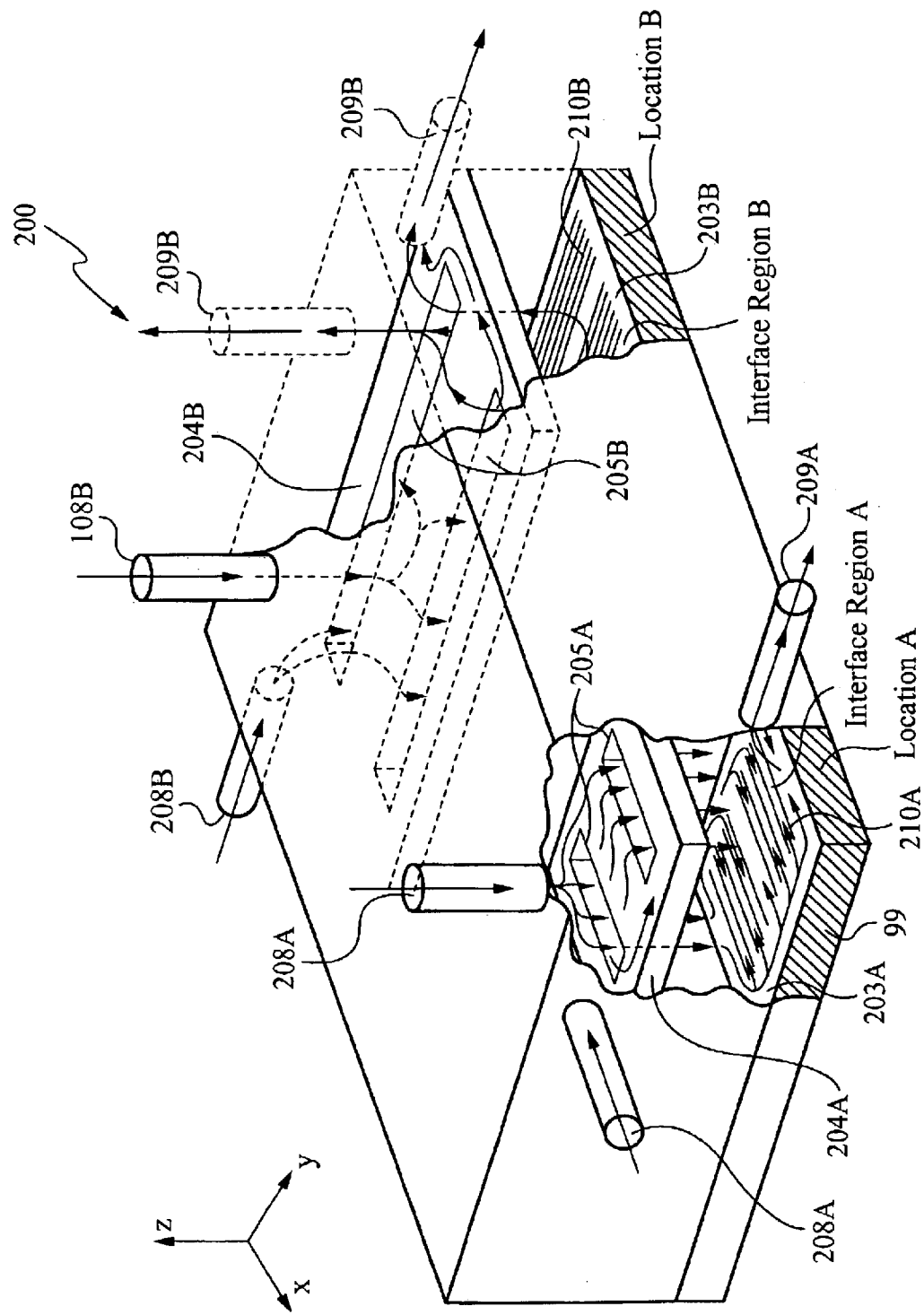
FIG. 11 illustrates a cut-away perspective view diagram of the alternate heat exchanger in accordance with the present invention.

FIG. 11 illustrates a broken-perspective view of a three tier heat exchanger 200 having the alternate manifold layer 200 in accordance with the present invention. As shown in FIG. 11, the heat exchanger 200 is divided into separate regions dependent on the amount of heat produced along the body of the heat source 99. The divided regions are separated by the vertical intermediate layer 204 and/or microchannel wall features 210 in the interface layer 202. However, it is apparent to one skilled in the art that the assembly shown in FIG. 11 is not limited to the configuration shown and is for exemplary purposes.

As shown in FIG. 3, the heat source 99 has a hot spot in location A and a warm spot, location B, whereby the hot spot in location A produces more heat than the warm spot in location B. It is apparent that the heat source 99 may have more than one hot spot and warm spot at any location at any given time. In the example, since location A is a hot spot and more heat in location A transfers to the interface layer 202 above location A (designated in FIG. 11 as interface hot spot region A), more fluid and/or a higher rate of liquid flow is provided to interface hot spot region A in the heat exchanger 200 to adequately cool location A. It is apparent that although interface hot spot region B is shown to be larger than interface hot spot region A, interface hot spot regions A and B, as well as any other interface hot spot regions in the heat exchanger 200, can be any size and/or configuration with respect to one another.

Alternatively, as shown in FIG. 11, the fluid enters the heat exchanger via fluid ports 208A is directed to interface hot spot region A by flowing along the intermediate layer 204 to the inflow conduits 205A. The fluid then flows down the inflow conduits 205A in the Z-direction into interface hot spot region A of the interface layer 202. The fluid flows in between the microchannels 210A whereby heat from location A transfers to the fluid by conduction through the interface layer 202. The heated fluid flows along the interface layer 202 in interface hot spot region A toward exit port 209A where the fluid exits the heat exchanger 200. It is apparent to one skilled in the art that any number of inlet ports 208 and exit ports 209 are utilized for a particular interface hot spot region or a set of interface hot spot regions. In addition, although the exit port 209A is shown near the interface layer 202A, the exit port 209A is alternatively positioned in any other location vertically, including but not limited to the manifold layer 209B.

Similarly, in the example shown in FIG. 11, the heat source 99 has a warm spot in location B which produces less heat than location A of the heat source 99. Fluid entering through the port 208B is directed to interface hot spot region B by flowing along the intermediate layer 204B to the inflow conduits 205B. The fluid then flows down the inflow conduits 205B in the Z-direction into interface hot spot region B of the interface layer 202. The fluid flows in between the microchannels 210 in the X and Y directions, whereby heat generated by the heat source in location B is transferred into the fluid. The heated fluid flows along the entire interface layer 202B in interface hot spot region B upward to exit ports 209B in the Z-direction via the outflow conduits 205B in the intermediate layer 204 whereby the fluid exits the heat exchanger 200.

Alternatively, as shown in FIG. 9A, the heat exchanger 200 alternatively includes a vapor permeable membrane 214 positioned above the interface layer 202. The vapor permeable membrane 214 is in sealable contact with the inner side walls of the heat exchanger 200. The membrane is configured to have several small apertures which allow vapor produced along the interface layer 202 to pass therethrough to the outlet port 209. The membrane 214 is also configured to be hydrophobic to prevent liquid fluid flowing along the interface layer 202 from passing through the apertures of the membrane 214. More details of the vapor permeable membrane 114 is discussed in co-pending U.S. application Ser. No. 10/366,128, filed Feb. 12, 2003 and entitled, "VAPOR ESCAPE MICROCHANNEL HEAT EXCHANGER" which is hereby incorporated by reference.

The microchannel heat exchanger of the present invention alternatively has other configurations not described above. For instance, the heat exchanger alternatively includes a manifold layer which minimizes the pressure drop within the heat exchanger in having separately sealed inlet and outlet apertures which lead to the interface layer. Thus, fluid flows directly to the interface layer through inlet apertures and undergoes thermal exchange in the interface layer. The fluid then exits the interface layer by flowing directly through outlet apertures arranged adjacent to the inlet apertures. This porous configuration of the manifold layer minimizes the amount of distance that the fluid must flow between the inlet and outlet ports as well as maximizes the division of fluid flow among the several apertures leading to the interface layer.

Figure 1A:
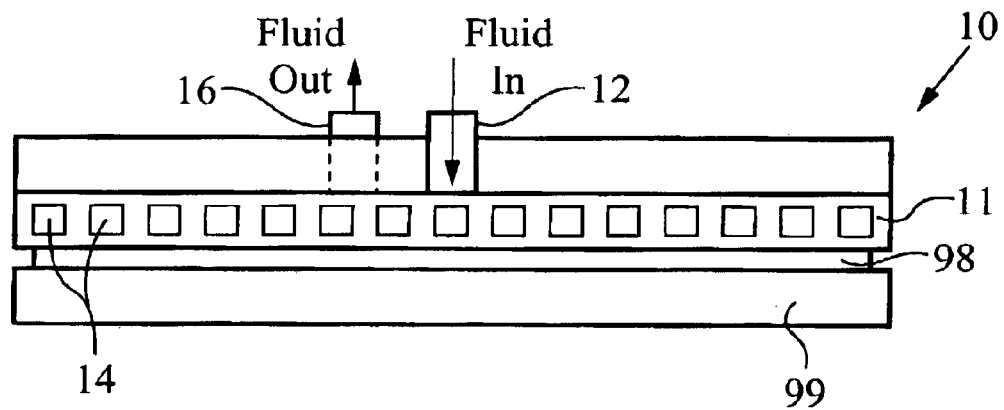
FIG. 1A illustrates a side view of a conventional heat exchanger.
Figure 1B:
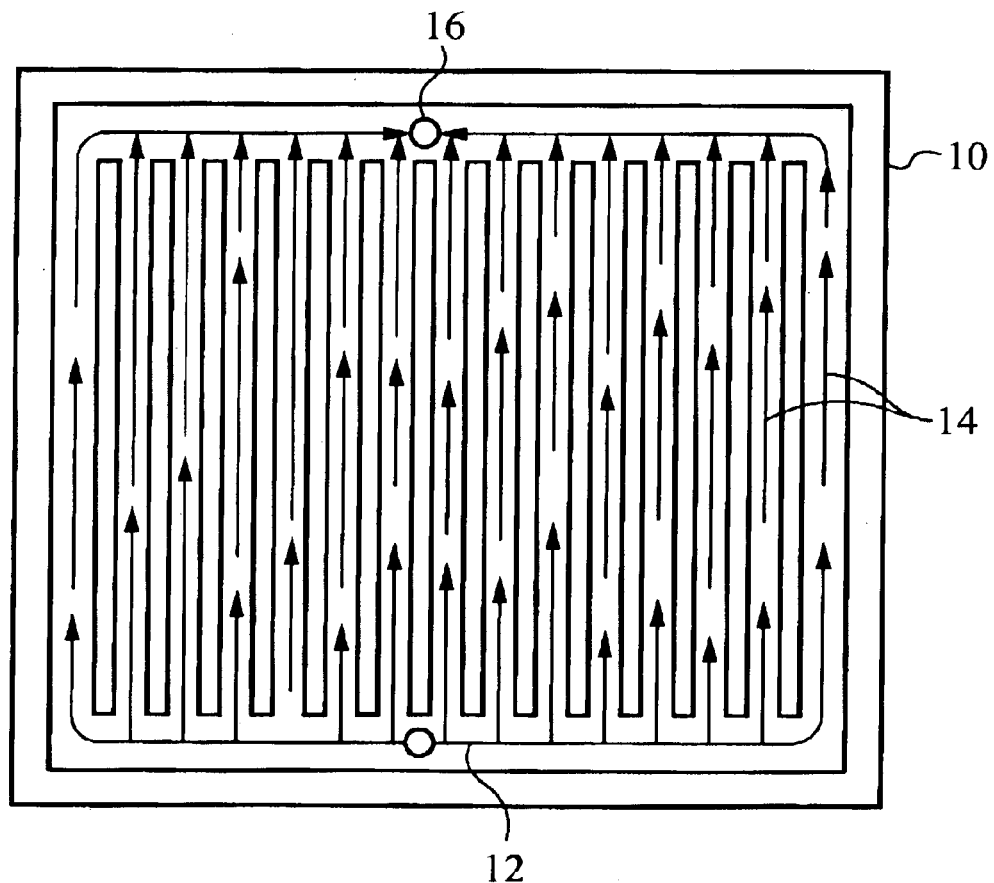
FIG. 1B illustrates a top view of the conventional heat exchanger.
Figure 1C:
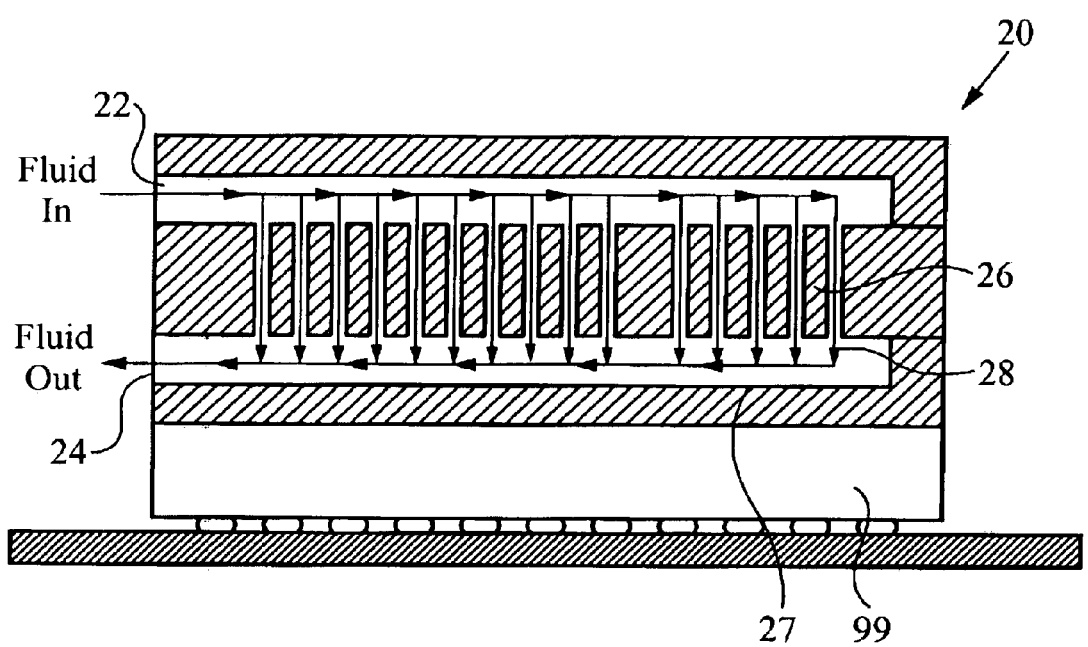
FIG. 1C illustrates a side view diagram of a prior art multi-level heat exchanger.

The details of how the heat exchanger 100 as well as the individual layers in the heat exchanger 100 are fabricated and manufactured are discussed below. The following discussion applies to the preferred and alternative heat exchangers of the present invention, although the heat exchanger 100 in FIG. 3B and individual layers therein are expressly referred to for simplicity. It is also apparent to one skilled in the art that although the fabrication/manufacturing details are described in relation to the present invention, the fabrication and manufacturing details also alternatively apply to conventional heat exchangers as well as two and three-tier heat exchangers utilizing one fluid inlet port and one fluid outlet port as shown in FIGS. 1A–1C.

Preferably, the interface layer 102 has a coefficient of thermal expansion (CTE) which is approximate or equal to that of the heat source 99. Thus, the interface layer 102 preferably expands and contracts accordingly with the heat source 99. Alternatively, the material of the interface layer 102 has a CTE which is different than the CTE of the heat source material. An interface layer 102 made from a material such as Silicon has a CTE that matches that of the heat source 99 and has sufficient thermal conductivity to adequately transfer heat from the heat source 99 to the fluid. However, other materials are alternatively used in the interface layer 102 which have CTEs that match the heat source 99.

The interface layer 102 in the heat exchanger 100 preferably has a high thermal conductivity for allowing sufficient conduction to pass between the heat source 99 and fluid flowing along the interface layer 102 such that the heat source 99 does not overheat. The interface layer 102 is preferably made from a material having a high thermal conductivity of 100 W/m-K. However, it is apparent to one skilled in the art that the interface layer 102 has a thermal conductivity of more or less than 100 W/m-K and is not limited thereto.

To achieve the preferred high thermal conductivity, the interface layer is preferably made from a semiconductor substrate, such as Silicon. Alternatively, the interface layer is made from any other material including, but not limited to single-crystalline dielectric materials, metals, aluminum, nickel and copper, Kovar, graphite, diamond, composites and any appropriate alloys. An alternative material of the interface layer 102 is a patterned or molded organic mesh.

Figure 12:
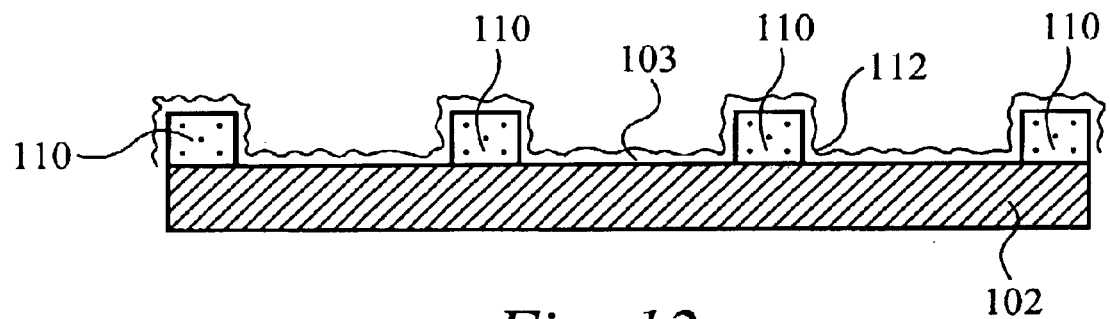
FIG. 12 illustrates a side view diagram of the interface layer of the heat exchanger having a coating material applied thereon in accordance with the present invention.

As shown in FIG. 12, it is preferred that the interface layer 102 is coated with a coating layer 112 to protect the material of the interface layer 102 as well as enhance the thermal exchange properties of the interface layer 102. In particular, the coating 112 provides chemical protection that eliminates certain chemical interactions between the fluid and the interface layer 102. For example, an interface layer 102 made from aluminum may be etched by the fluid coming into contact with it, whereby the interface layer 102 would deteriorate over time. The coating 112 of a thin layer of Nickel, approximately 25 microns, is thus preferably electroplated over the surface of the interface layer 102 to chemically pacify any potential reactions without significantly altering the thermal properties of the interface layer 102. It is apparent that any other coating material with appropriate layer thickness is contemplated depending on the material(s) in the interface layer 102.

In addition, the coating material 112 is applied to the interface layer 102 to enhance the thermal conductivity of the interface layer 102 to perform sufficient heat exchange with the heat source 99, as shown in FIG. 12. For example, an interface layer 102 having a metallic base covered with plastic can be thermally enhanced with a layer of Nickel coating material 112 on top of the plastic. The layer of Nickel has a thickness of at least 25 microns, depending on the dimensions of the interface layer 102 and the heat source 99. It is apparent that any other coating material with appropriate layer thickness is contemplated depending on the material(s) in the interface layer 102. The coating material 112 is alternatively used on material already having high thermal conductivity characteristics, such that the coating material enhances the thermal conductivity of the material. The coating material 112 is preferably applied to the bottom surface 103 as well as the microchannel walls 110 of the interface layer 102, as shown in FIG. 12. Alternatively, the coating material 112 is applied to either of the bottom surface 103 or microchannel walls 110. The coating material 112 is preferably made from a metal including, but not limited to, Nickel and Aluminum. However, the coating material 112 is alternatively made of any other thermally conductive material.

The interface layer 102 is preferably formed by an etching process using a Copper material coated with a thin layer of Nickel to protect the interface layer 102. Alternatively, the interface layer 102 is made from Aluminum, Silicon substrate, plastic or any other appropriate material. The interface layer 102 being made of materials having poor thermal conductivity are also coated with the appropriate coating material to enhance the thermal conductivity of the interface layer 102. One method of electroforming the interface layer is by applying a seed layer of chromium or other appropriate material along the bottom surface 103 of the interface layer 102 and applying electrical connection of appropriate voltage to the seed layer. The electrical connection thereby forms a layer of the thermally conductive coating material 112 on top of the interface layer 102. The electroforming process also forms feature dimensions in a range of 10–100 microns. The interface layer 102 is formed by an electroforming process, such as patterned electroplating. In addition, the interface layer is alternatively processed by photochemical etching or chemical milling, alone or in combination, with the electroforming process. Standard lithography sets for chemical milling are used to process features in the interface layer 102. Additionally, the aspect ratios and tolerances are enhanceable using laser assisted chemical milling processes.

The microchannel walls 110 are preferably made of Silicon. The microchannel walls 110 are alternatively made of any other materials including, but not limited to, patterned glass, polymer, and a molded polymer mesh. Although it is preferred that the microchannel walls 110 are made from the same material as that of the bottom surface 103 of the interface layer 102, the microchannel walls 110 are alternatively made from a different material than that of the rest of the interface layer 102.

It is preferred that the microchannel walls 110 have thermal conductivity characteristics of at least 20 W/m-K. Alternatively, the microchannel walls 110 have thermal conductivity characteristics of more than 20 W/m-K. It is apparent to one skilled in the art that the microchannel walls 110 alternatively have thermal conductivity characteristics of less than 20 W/m-K, whereby coating material 112 is applied to the microchannel walls 110, as shown in FIG. 12, to increase the thermal conductivity of the wall features 110. For microchannel walls 110 made from materials already having a good thermal conductivity, the coating 112 applied has a thickness of at least 25 microns which also protects the surface of the microchannel walls 110. For microchannel walls 110 made from material having poor thermal conductivity characteristics, the coating 112 has a thermal conductivity of at least 50 W/m-K and is more than 25 microns thick. It is apparent to one skilled in the art that other types of coating materials as well as thickness dimensions are contemplated.

To configure the microchannel walls 110 to have an adequate thermal conductivity of at least 20 W/m-K, the walls 110 are electroformed with the coating material 112 (FIG. 12), such as Nickel or other metal, as discussed above. To configure the microchannel walls 110 to have an adequate thermal conductivity of at least 50 W/m-K, the walls 110 are electroplated with Copper on a thin metal film seed layer. Alternatively, the microchannel walls 110 are not coated with the coating material.

The microchannel walls 110 are preferably formed by a hot embossing technique to achieve a high aspect ratio of channel walls 110 along the bottom surface 103 of the interface layer 102. The microchannel wall features 110 are alternatively fabricated as Silicon structures deposited on a glass surface, whereby the features are etched on the glass in the desired configuration. The microchannel walls 110 are alternatively formed by a standard lithography techniques, stamping or forging processes, or any other appropriate method. The microchannel walls 110 are alternatively made separately from the interface layer 102 and coupled to the interface layer 102 by anodic or epoxy bonding. Alternatively, the microchannel features 110 are coupled to the interface layer 102 by conventional electroforming techniques, such as electroplating.

There are a variety of methods that can be used to fabricate the intermediate layer 104. The intermediate layer is preferably made from Silicon. It is apparent to one skilled in the art that any other appropriate material is contemplated including, but not limited to glass or laser-patterned glass, polymers, metals, glass, plastic, molded organic material or any composites thereof. Preferably, the intermediate layer 104 is formed using plasma etching techniques. Alternatively, the intermediate layer 104 is formed using a chemical etching technique. Other alternative methods include machining, etching, extruding and/or forging a metal into the desired configuration. The intermediate layer 104 is alternatively formed by injection molding of a plastic mesh into the desired configuration. Alternatively, the intermediate layer 104 is formed by laser-drilling a glass plate into the desired configuration.

The manifold layer 106 is manufactured by a variety of methods. It is preferred that the manifold layer 106 is fabricated by an injection molding process utilizing plastic, metal, polymer composite or any other appropriate material, whereby each layer is made from the same material. Alternatively, as discussed above, each layer is made from a different material. The manifold layer 106 is alternatively generated using a machined or etched metal technique. It is apparent to one skilled in the art that the manifold layer 106 is manufactured utilizing any other appropriate method.

The intermediate layer 104 is coupled to the interface layer 102 and manifold layer 106 to form the heat exchanger 100 using a variety of methods. The interface layer 102, intermediate layer 104 and manifold layer 106 are preferably coupled to one another by an anodic, adhesive or eutectic bonding process. The intermediate layer 104 is alternatively integrated within features of the manifold layer 106 and interface layer 102. The intermediate layer 104 is coupled to the interface layer 102 by a chemical bonding process. The intermediate layer 104 is alternatively manufactured by a hot embossing or soft lithography technique, whereby a wire EDM or Silicon master is utilized to stamp the intermediate layer 104. The intermediate layer 104 is then alternatively electroplated with metal or another appropriate material to enhance the thermal conductivity of the intermediate layer 104, if needed.

Alternatively, the intermediate layer 104 is formed along with the fabrication of the microchannel walls 110 in the interface layer 102 by an injection molding process. Alternatively, the intermediate layer 104 is formed with the fabrication of the microchannel walls 110 by any other appropriate method. Other methods of forming the heat exchanger include, but are not limited to soldering, fusion bonding, eutectic Bonding, intermetallic bonding, and any other appropriate technique, depending on the types of materials used in each layer.

Figure 13:
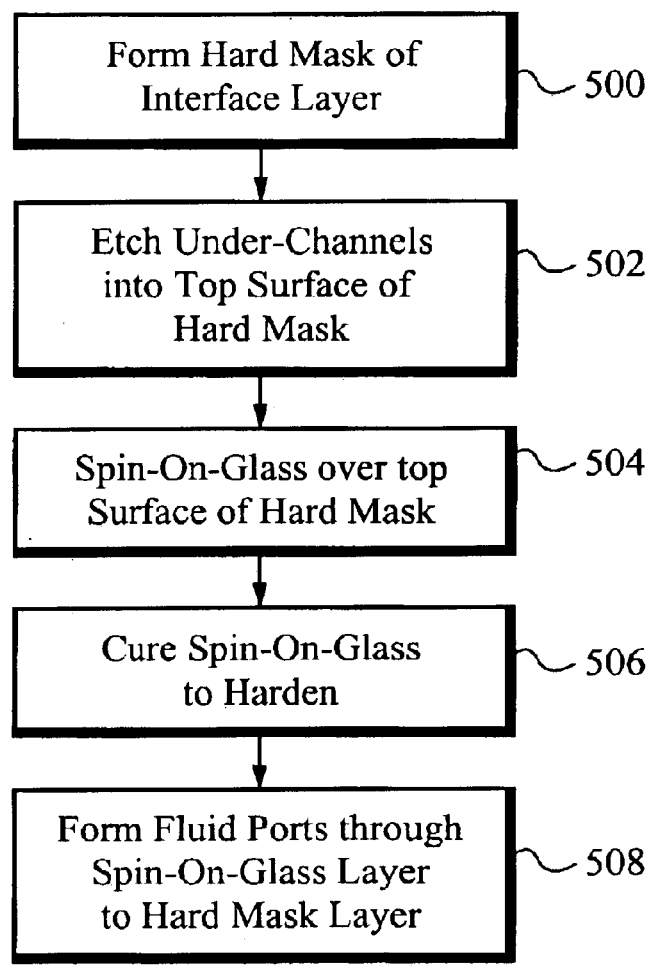
FIG. 13 illustrates a flow chart of an alternative method of manufacturing the heat exchanger in accordance with the present invention.

Another alternative method of manufacturing the heat exchanger of the present invention is described in FIG. 13. As discussed in relation to FIG. 13, an alternative method of manufacturing the heat exchanger includes building a hard mask formed from a silicon substrate as the interface layer (step 500). The hard mask is made from silicon dioxide or alternatively spin-on-glass. Once the hard mask is formed, a plurality of under-channels are formed in the hard mask, wherein the under-channels form the fluid paths between the microchannel walls 110 (step 502). The under-channels are formed by any appropriate method, including but not limited to HF etching techniques, chemical milling, soft lithography and xenon difluoride etch. In addition, enough space between each under-channel must be ensured such that under-channels next to one another do not bridge together. Thereafter, spin-on-glass is then applied by any conventional method over the top surface of the hard mask to form the intermediate and manifold layers (step 504). Following, the intermediate and manifold layers are hardened by a curing method (step 506). Once the intermediate and manifold layers are fully formed and hardened, one or more fluid ports are formed into the hardened layer (step 508). The fluid ports are etched or alternatively drilled into the manifold layer. Although specific methods of fabricating the interface layer 102, the intermediate layer 104 and manifold layer 106 are discussed herein, other known methods known in art to manufacture the heat exchanger 100 are alternatively contemplated.

Figure 14:
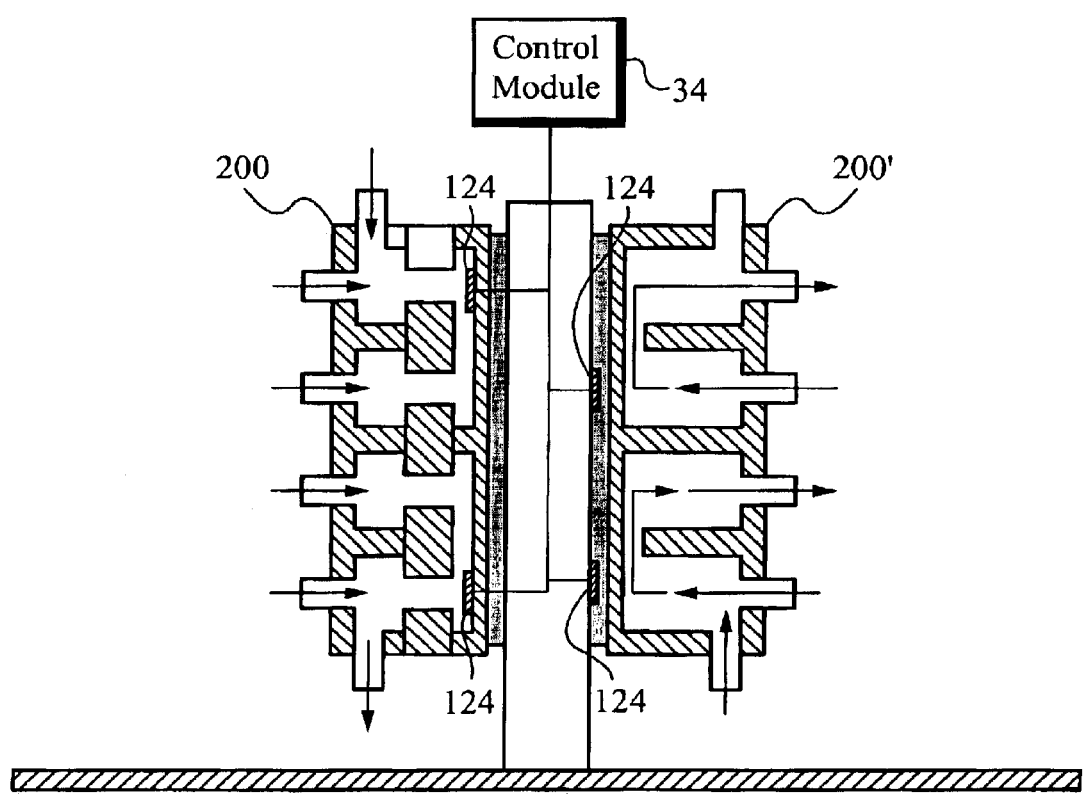
FIG. 14 illustrates a schematic of an alternate embodiment of the present invention having two heat exchangers coupled to a heat source.

FIG. 14 illustrates an alternative embodiment of the heat exchanger of the present invention. As shown in FIG. 6, two heat exchangers 200, 200' are coupled to one heat source 99. In particular, the heat source 99, such as an electronic device, is coupled to a circuit board 96 and is positioned upright, whereby each side of the heat source 99 is potentially exposed. A heat exchanger of the present invention is coupled to one exposed side of the heat source 99, whereby both heat exchangers 200, 200' provide maximum cooling of the heat source 99. Alternatively, the heat source is coupled to the circuit board horizontally, whereby more than one heat exchanger is stacked on top of the heat source 99 (not shown), whereby each heat exchanger is electrically coupled to the heat source 99. More details regarding this embodiment are shown and described in co-pending U.S. patent application Ser. No. 10/072,137, filed Feb. 7, 2002, entitled "POWER CONDITIONING MODULE" which is hereby incorporated by reference.

As shown in FIG. 14, the heat exchanger 200 having two layers is coupled to the left side of the heat source 99 and the heat exchanger 200' having three layers is coupled to the right side of the heat source 99. It is apparent to one skilled in the art that the preferred or alternative heat exchangers are coupled to the sides of the heat source 99. It is also apparent to one skilled in the art that the alternative embodiments of the heat exchanger 200' are alternatively coupled to the sides of the heat source 99. The alternative embodiment shown in FIG. 14 allows more precise hot spot cooling of the heat source 99 by applying fluid to cool hot spots which exist along the thickness of the heat source 99. Thus, the embodiment in FIG. 14 applies adequate cooling to hot spots in the center of the heat source 99 by exchanging heat from both sides of the heat source 99. It is apparent to one skilled in the art that the embodiment shown in FIG. 14 is used with the cooling system 30 in FIGS. 2A–2B, although other closed loop systems are contemplated.

As stated above, the heat source 99 may have characteristics in which the locations of one or more of the hot spots change due to different tasks required to be performed by the heat source 99. To adequately cool the heat source 99, the system 30 alternatively includes a sensing and control module 34 (FIGS. 2A–2B) which dynamically changes the amount of flow and/or flow rate of fluid entering the heat exchanger 100 in response to a change in location of the hot spots.

In particular, as shown in FIG. 14, one or more sensors 124 are placed in each interface hot spot region in the heat exchanger 200 and/or alternatively the heat source 99 at each potential hot spot location. Alternatively, a plurality of heat sources are uniformly placed in between the heat source and heat exchanger and/or in the heat exchanger itself. The control module 38 (FIGS. 2A–2B) is also coupled to one or more valves in the loop 30 which control the flow of fluid to the heat exchanger 100. The one or more valves are positioned within the fluid lines, but are alternatively positioned elsewhere. The plurality of sensors 124 are coupled to the control module 34, whereby the control module 34 is preferably placed upstream from heat exchanger 100, as shown in FIG. 2. Alternatively, the control module 34 is placed at any other location in the closed loop system 30.

The sensors 124 provide information to the control module 34 including, but not limited to, the flow rate of fluid flowing in the interface hot spot region, temperature of the interface layer 102 in the interface hot spot region and/or heat source 99 and temperature of the fluid. For example, referring to the schematic in FIG. 14, sensors positioned on the interface 124 provide information to the control module 34 that the temperature in a particular interface hot spot region in heat exchanger 200 is increasing whereas the temperature in a particular interface hot spot region in heat exchanger 200' is decreasing. In response, the control module 34 increases the amount of flow to heat exchanger 200 and decreases the amount of flow provided to heat exchanger 200'. Alternatively, the control module 34 alternatively changes the amount of flow to one or more interface hot spot regions in one or more heat exchangers in response to the information received from the sensors 118. Although the sensors 118 are shown with the two heat exchangers 200, 200' in FIG. 14, it is apparent that the sensors 118 are alternatively coupled with only one heat exchanger.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A heat exchanger comprising:
   a. an interface layer for cooling a heat source, wherein the interface layer is configured to pass fluid therethrough, the interface layer coupled to the heat source; and
   b. a manifold layer for circulating fluid to and from the interface layer, wherein the manifold layer is configured to selectively cool at least one interface hot spot region in the heat source by providing a greater flow rate of fluid to the at least one interface hot spot region than to cooler interface regions in the heat source.

2. The heat exchanger according to claim 1 wherein the manifold layer is configured to achieve temperature uniformity in a predetermined location in the heat source.

3. The heat exchanger according to claim 1 wherein the fluid is in single phase flow conditions.

4. The heat exchanger according to claim 1 wherein the fluid is in two phase flow conditions.

5. The heat exchanger according to claim 1 wherein at least a portion of the fluid undergoes a transition between single and two phase flow conditions in the interface layer.

6. The heat exchanger according to claim 1 wherein manifold layer is configured to optimize hot spot cooling of the heat source.

7. The heat exchanger according to claim 1 wherein the manifold layer is positioned above the interface layer, wherein fluid flows between the manifold layer and the interface layer.

8. The heat exchanger according to claim 7 wherein the manifold layer further comprises a plurality of fluid delivery passages disposed across at least one dimension in the manifold layer.

9. The heat exchanger according to claim 8 wherein the fluid delivery passages are arranged in parallel.

10. The heat exchanger according to claim 8 wherein at least one fluid delivery passage is arranged non-parallel to another fluid delivery passage.

11. The heat exchanger according to claim 8 further comprising a plurality of fluid ports for circulating fluid to and from the heat exchanger, wherein at least one of the plurality of fluid ports further comprises at least one inlet port and at least one outlet port.

12. The heat exchanger according to claim 11 wherein the plurality of fluid ports circulate fluid to one or more of the interface hot spot regions.

13. The heat exchanger according to claim 12 wherein the at least one interface hot spot region is sealably separated from an adjacent interface hot spot region.

14. The heat exchanger according to claim 11 wherein at least one of the plurality of fluid ports is configured vertically.

15. The heat exchanger according to claim 11 wherein at least one of the plurality of fluid ports is configured horizontally.

16. The heat exchanger according to claim 11 wherein at least one of the plurality of fluid ports is coupled to the manifold layer.

17. The heat exchanger according to claim 11 wherein at least one of the plurality of fluid ports is coupled to the interface layer.

18. The heat exchanger according to claim 11 further comprising an intermediate layer having a plurality of conduits to channel fluid between the manifold layer and the at least one interface hot spot regions, the intermediate layer positioned between the interface layer and the manifold layer.

19. The heat exchanger according to claim 18 wherein the intermediate layer is coupled to the interface layer and the manifold layer.

20. The heat exchanger according to claim 18 wherein the intermediate layer is integrally formed with the interface layer and the manifold layer.

21. The heat exchanger according to claim 18 wherein at least one of the plurality of conduits has at least one varying dimension in the intermediate layer.

22. The heat exchanger according to claim 1 wherein the interface layer includes a coating thereupon, wherein the coating provides an appropriate thermal conductivity of at least 100 W/m-K.

23. The heat exchanger according to claim 22 wherein the coating is made of a Nickel based material.

24. The heat exchanger according to claim 1 wherein the interface layer has a thermal conductivity is at least 100 W/m-K.

25. The heat exchanger according to claim 1 further comprises a plurality of pillars configured in a predetermined pattern along the interface layer.

26. The heat exchanger according to claim 1 wherein the interface layer has a roughened surface.

27. The heat exchanger according to claim 1 wherein the interface layer includes a micro-porous structure disposed thereon.

28. The heat exchanger according to claim 1 further comprises a plurality of microchannels configured in a predetermined pattern along the interface layer.

29. The heat exchanger according to claim 28 wherein the plurality of microchannels are coupled to the interface layer.

30. The heat exchanger according to claim 28 wherein the plurality of microchannels are integrally formed with the interface layer.

31. The heat exchanger according to claim 28 wherein the plurality of microchannels include a coating thereupon, wherein the coating has a thermal conductivity of at least 20 W/m-K.

32. The heat exchanger according to claim 1 further comprising at least one sensor for providing information associated with operation of the heat source, wherein the sensor is disposed substantially proximal to the interface hot spot region.

33. The heat exchanger according to claim 32 further comprising a control module coupled to the at least one sensor, the control module for controlling fluid flow into the heat exchanger in response to information provided from the sensor.

34. The heat exchanger according to claim 11 further comprising a vapor escape membrane positioned above the interface layer, the vapor escape membrane for allowing vapor to pass therethrough to the at least one outlet port, wherein the vapor escape membrane retains fluid along the interface layer.

35. The heat exchanger according to claim 1 wherein the interface layer is integrally formed with the heat source.

36. A heat exchanger comprising:
  a. an interface layer for cooling a heat source, the interface layer coupled to the heat source and configured to pass fluid therethrough; and
  b. a manifold layer for providing fluid to the interface layer, wherein the manifold layer includes a plurality of fingers configured to minimize pressure drop within the heat exchanger and for providing a greater flow rate of fluid to at least one interface hot spot region in the heat source than to cooler interface regions in the heat source.

37. The heat exchanger according to claim 36 wherein the fluid is in single phase flow conditions.

38. The heat exchanger according to claim 36 wherein the fluid is in two phase flow conditions.

39. The heat exchanger according to claim 36 wherein at least a portion of the fluid undergoes a transition between single and two phase flow conditions in the interface layer.

40. The heat exchanger according to claim 36 wherein the manifold layer is configured to cool at least one interface hot spot region in the heat source.

41. The heat exchanger according to claim 36 wherein the manifold layer is configured to provide substantial temperature uniformity in the heat source.

42. The heat exchanger according to claim 36 wherein the interface layer includes a coating thereupon, wherein the coating provides an appropriate thermal conductivity of at least 100 W/m-K.

43. The heat exchanger according to claim 42 wherein the coating is made of a Nickel based material.

44. The heat exchanger according to claim 36 wherein the interface layer has a thermal conductivity of at least 100 W/mk.

45. The heat exchanger according to claim 36 wherein at least one of the plurality of fingers is non-parallel to another finger in the manifold layer.

46. The heat exchanger according to claim 36 wherein the plurality of fingers are parallel to one another.

47. The heat exchanger according to claim 46 wherein each of the fingers have the same length and width dimensions.

48. The heat exchanger according to claim 36 wherein at least one of the fingers has a different dimension than the remaining fingers.

49. The heat exchanger according to claim 46 wherein the plurality of fingers are arranged non-periodically in at least one dimension in the manifold layer.

50. The heat exchanger according to claim 36 wherein at least one of the plurality of fingers has at least one varying dimension along a length of the manifold layer.

51. The heat exchanger according to claim 46 wherein the manifold layer includes more than three and less than 10 parallel fingers.

52. The heat exchanger according to claim 36 further comprising a plurality of fluid ports coupled to the manifold layer, the fluid ports for providing fluid to and removing fluid from the heat exchanger.

53. The heat exchanger according to claim 52 wherein at least one fluid port circulates fluid to at least one predetermined interface hot spot region in the interface layer.

54. The heat exchanger according to claim 52 wherein at least one fluid port in the plurality is configured vertically with respect to the heat source.

55. The heat exchanger according to claim 52 wherein at least one fluid port in the plurality is configured horizontally with respect to the heat source.

56. The heat exchanger according to claim 52 further comprising an intermediate layer having a plurality of conduits arranged in a predetermined configuration for channeling fluid between the manifold layer and the interface layer, the intermediate layer positioned between the interface layer and the manifold layer.

57. The heat exchanger according to claim 56 wherein the plurality of conduits further comprise at least one inlet conduit for channeling fluid from the manifold layer to the interface layer.

58. The heat exchanger according to claim 56 wherein the plurality of conduits further comprise at least one outlet conduit for channeling fluid from the interface layer to the manifold layer.

59. The heat exchanger according to claim 57 wherein at least one of the plurality of conduits has at least one varying dimension along a length of the intermediate layer.

60. The heat exchanger according to claim 56 wherein the intermediate layer is coupled to the interface layer and the manifold layer.

61. The heat exchanger according to claim 56 wherein the intermediate layer is integrally formed with the interface layer and the manifold layer.

62. The heat exchanger according to claim 36 wherein the interface layer includes a coating thereupon, wherein the coating has an appropriate thermal conductivity.

63. The heat exchanger according to claim 62 wherein the thermal conductivity is at least 100 W/m-K.

64. The heat exchanger according to claim 36 further comprises a plurality of pillars configured in a predetermined pattern along the interface layer.

65. The heat exchanger according to claim 36 wherein the interface layer has a roughened surface.

66. The heat exchanger according to claim 36 wherein the interface layer includes a micro-porous structure disposed thereon.

67. The heat exchanger according to claim 36 further comprises a plurality of microchannels disposed along the interface layer.

68. The heat exchanger according to claim 67 wherein the plurality of microchannels are coupled to the interface layer.

69. The heat exchanger according to claim 67 wherein the plurality of microchannels are integrally formed with the interface layer.

70. The heat exchanger according to claim 67 wherein the plurality of microchannels include a coating thereupon, wherein the coating has a thermal conductivity of at least 20 W/m-K.

71. The heat exchanger according to claim 36 further comprising a vapor escape membrane positioned above the interface layer, the vapor escape membrane for allowing vapor to pass therethrough to the outlet port, wherein the vapor escape membrane retains fluid along at least a portion of the interface layer.

72. The heat exchanger according to claim 36 wherein the interface layer is integrally formed with the heat source.

73. A method of manufacturing a heat exchanger configured for cooling a heat source, the method comprising the steps of:
   a. forming an interface layer capable of transferring heat from the heat source to the interface layer and capable of passing fluid therethrough, wherein the interface layer has an appropriate thermal conductivity; and
   b. forming a manifold layer configureable to circulate fluid to and from the interface layer and to provide a greater flow rate of fluid to at least one interface hot spot region in the heat source than to cooler interface regions in the heat source, wherein the manifold layer is configureable to be coupled to the interface layer.

74. The method of manufacturing according to claim 73 further comprising the step of configuring the manifold layer to achieve temperature uniformity in the heat source.

75. The method of manufacturing according to claim 73 further comprising the step of configuring the manifold layer to minimize pressure drop in the heat exchanger.

76. The method of manufacturing according to claim 73 wherein the fluid is in single phase flow conditions.

77. The method of manufacturing according to claim 73 wherein the fluid is in two phase flow conditions.

78. The method of manufacturing according to claim 73 further comprising the step of configuring the manifold layer to include a plurality of fingers disposed in an arrangement to deliver fluid to at least one interface hot spot region.

79. The method of manufacturing according to claim 73 further comprising the step of coupling a plurality of fluid ports to the heat exchanger, wherein one or more of the plurality of fluid ports are configured to circulate fluid directly to one or more selected interface hot spot regions.

80. The method of manufacturing according to claim 73 further comprising the step of coupling a single inlet port and a single outlet port to the heat exchanger, wherein the inlet and outlet ports circulate fluid directly to one or more selected interface hot spot regions.

81. The method of manufacturing according to claim 79 wherein at least one of the plurality of fluid inlets are configured vertically with respect to the heat source.

82. The method of manufacturing according to claim 79 wherein at least one of the plurality of fluid inlets are configured horizontally with respect to the heat source.

83. The method of manufacturing according to claim 79 further comprising the step of forming an intermediate layer having a plurality of conduits for channeling fluid between the manifold layer and the interface layer, wherein the intermediate layer is configured to be positionable between the manifold and interface layers.

84. The method of manufacturing according to claim 83 wherein the intermediate layer is coupled to the interface layer and the manifold layer.

85. The method of manufacturing according to claim 84 herein the intermediate layer is coupled to the interface layer and the manifold layer by a bonding process.

86. The method of manufacturing according to claim 83 wherein at least one of the plurality of conduits has at least one varying dimension in the intermediate layer.

87. The method of manufacturing according to claim 83 wherein the intermediate layer is integrally formed with the manifold layer and the interface layer.

88. The method of manufacturing according to claim 73 further comprising the step of applying a thermally conductive coating to the interface layer.

89. The method of manufacturing according to claim 88 wherein the thermally conductive coating is made of a Nickel based material.

90. The method of manufacturing according to claim 88 wherein the thermal conductive coating is applied by an electroforming process.

91. The method of manufacturing according to claim 88 wherein the thermal conductive coating is applied by an electroplating process.

92. The method of manufacturing according to claim 73 further comprising the step of configuring a plurality of microchannels in a predetermined pattern along the interface layer.

93. The method of manufacturing according to claim 73 further comprising the step of configuring a plurality of pillars in a predetermined pattern along the interface layer.

94. The method of manufacturing according to claim 73 further comprising the step of configuring the interface layer to have a roughened surface.

95. The method of manufacturing according to claim 73 further comprising the step of disposing a micro-porous structure on the interface layer.

96. The method of manufacturing according to claim 92 further comprising the step of coupling the plurality of microchannels to the interface layer.

97. The method of manufacturing according to claim 92 further comprising the step of integrally forming the plurality of microchannels with the interface layer.

98. The method of manufacturing according to claim 92 further comprising the step of applying a coating upon the plurality of microchannels, wherein the coating has a thermal conductivity of at least 20 W/m-K.

99. The method of manufacturing according to claim 98 wherein the step of applying the coating further comprises:
   a. applying a seed layer of appropriate material to an application surface of the plurality of microchannels; and
   b. providing electrical connection to the seed layer.

100. The method of manufacturing according to claim 98 wherein the step of coating is applied upon the plurality of microchannels by an electroforming process.

101. The method of manufacturing according to claim 73 further comprising the step of positioning a vapor escape membrane above the interface layer, wherein the vapor escape membrane retains fluid along the interface layer and allows vapor to pass therethrough to an outlet port.

102. The method of manufacturing according to claim 73 wherein the interface layer is formed by an etching process.

103. The method of manufacturing according to claim 73 wherein the interface layer is formed by an electroforming process.

104. The method of manufacturing according to claim 73 wherein the interface layer is formed by a photochemical etching process.

105. The method of manufacturing according to claim 73 wherein the interface layer is formed by a chemical etching process.

106. The method of manufacturing according to claim 73 wherein the interface layer is formed by a laser assisted chemical etching process.

107. The method of manufacturing according to claim 73 wherein the interface layer is formed integrally with the heat source.

108. The method of manufacturing according to claim 92 wherein the plurality of microchannels are fabricated by an electroforming process.

109. The method of manufacturing according to claim 108 wherein the electroforming process is performed in combination with a hot embossing technique.

110. The method of manufacturing according to claim 108 wherein the electroforming process further comprises utilizing a soft lithography patterning technique.

111. The method of manufacturing according to claim 83 wherein the intermediate layer is formed by a plasma etching process.

112. The method of manufacturing according to claim 83 wherein the intermediate layer is formed by a chemical etching process.

113. The method of manufacturing according to claim 83 wherein the intermediate layer is formed by machining a metal into the desired configuration.

114. The method of manufacturing according to claim 83 wherein the intermediate layer is formed by an injection molding process.

115. The method of manufacturing according to claim 83 wherein the intermediate layer is formed by a laser drilling process.

116. The method of manufacturing according to claim 83 wherein the intermediate layer is formed by a hot embossing technique.

117. The method of manufacturing according to claim 83 wherein the intermediate layer is formed by a soft lithography technique.

118. The method of manufacturing according to claim 83 wherein the intermediate layer is formed by a machining process.

119. The method of manufacturing according to claim 73 wherein the manifold layer is formed by an injection molding process.

120. The method of manufacturing according to claim 73 wherein the manifold layer is formed by an etching process.

121. The method of manufacturing according to claim 73 wherein the manifold layer is formed by a machining process.

122. The heat exchanger according to claim 73 wherein the interface layer is integrally formed with the heat source.

123. A heat exchanger comprising:
   a. means for cooling a heat source, the means for cooling coupled to the heat source and configured to pass fluid therethrough; and
   b. means for providing fluid to the means for cooling, the means for providing configured to cool selected interface hot spot regions of the heat source, to minimize pressure drop within the heat exchanger, and to provide a greater flow rate of fluid to the selected interface hot spot regions than to cooler interface regions of the heat source.

124. An electronic device comprising:
   a. an integrated circuit;
   b. an interface layer integrally formed with the integrated circuit and configured to pass fluid therethrough; and
   c. a manifold layer for circulating fluid with the interface layer, wherein the manifold layer is configured to selectively cool at least one interface hot spot region and to provide a greater flow rate of fluid to the at least one interface hot spot region than to cooler interface regions.

125. An electronic device comprising:
   a. an integrated circuit;
   b. an interface layer integrally formed with the integrated circuit and configured to pass fluid therethrough; and
   c. a manifold layer for circulating fluid with the interface layer, wherein the manifold layer includes a plurality of fingers configured to minimize pressure drop within the electronic device and to provide a greater flow rate of fluid to at least one interface hot spot region in the integrated circuit than to cooler interface regions in the integrated circuit.

126. A method of manufacturing an electronic device comprising the steps of:
   a. providing an integrated circuit;
   b. forming an interface layer integrally with the integrated circuit, the interface layer capable of absorbing heat generated from the integrated circuit and capable of passing fluid therethrough; and
   c. forming a manifold layer to the interface layer, the manifold layer configurable to circulate fluid with the interface layer, to minimize pressure drop within the electronic device, and to provide a greater flow rate of fluid to at least one interface hot spot region in the integrated circuit than to cooler interface regions in the integrated circuit.

127. A closed loop system for cooling at least one integrated circuit comprising:
   a. at least one heat exchanger for absorbing heat generated by the integrated circuit, the heat exchanger further comprising:
      i. an interface layer in contact with the integrated circuit and configured to pass fluid therethrough; and
      ii. a manifold layer coupled to the interface layer, the manifold layer adapted to circulate fluid with the interface layer, to minimize pressure drop within the heat exchanger, and to provide a greater flow rate of fluid to at least one interface hot spot region in the integrated circuit than to cooler interface regions in the integrated circuit;
   b. at least one pump for circulating fluid throughout the loop, the pump coupled to the at least one heat exchanger; and
   c. at least one heat rejector coupled to the pump and the heat exchanger, the heat rejector fo cooling heated liquid output from the heat exchanger.

* * * * *

UNITED STATES PATENT AND TRADEMARK OFFICE
CERTIFICATE OF CORRECTION

PATENT NO. : 6,988,534 B2 Page 1 of 1
DATED : January 24, 2006
INVENTOR(S) : Thomas W. Kenny et al.

It is certified that error appears in the above-identified patent and that said Letters Patent is hereby corrected as shown below:

Title page,
Item [60], Related U.S. Application Data, replace "provisional application No. 60/442,382" with -- provisional application No. 60/442,383 --; and replace "filed on Jan. 23, 2003" with -- filed on Jan. 24, 2003 --.
Item [56], References Cited, U.S. PATENT DOCUMENTS, add the following:
-- 5,316,077        5/1994        Reichard
   6,606,251 B1     8/2003        Kenny, Jr. et al.
   6,167,948 B1     1/2001        Thomas
   20020075645      6/2002        Kitano et al.
   20030062149 A1   4/2003        Goodson et al. --.
OTHER PUBLICATIONS, add
-- X.F. Peng et al., "Enhancing the Critical Heat Flux Using Microchanneled Surfaces", Enhanced Heat Transfer, 1998, Vol. 5 pp165-176. --.

Signed and Sealed this

Eighteenth Day of April, 2006

JON W. DUDAS
*Director of the United States Patent and Trademark Office*